United States Patent [19]

Sakamura et al.

[11] Patent Number: 5,274,637
[45] Date of Patent: Dec. 28, 1993

[54] TOKEN-RING-TYPE LOCAL AREA NETWORK

[75] Inventors: Ken Sakamura, Tokyo; Kanehisa Tsurumi, Hamamatsu; Kazushi Tamai, Hamamatsu; Nobuharu Nakamura, Hamamatsu, all of Japan

[73] Assignee: Yamaha Corporation, Hamamatsu, Japan

[21] Appl. No.: 636,090

[22] Filed: Dec. 28, 1990

[30] Foreign Application Priority Data

Dec. 28, 1989 [JP] Japan ............................ 1-342291
Dec. 28, 1989 [JP] Japan ............................ 1-342292
Dec. 28, 1989 [JP] Japan ............................ 1-342293
Dec. 28, 1989 [JP] Japan ............................ 1-342294
Dec. 28, 1989 [JP] Japan ............................ 1-342295

[51] Int. Cl.$^5$ ............................................ H04J 3/02
[52] U.S. Cl. ................................. 370/85.5; 370/854; 370/85.15
[58] Field of Search ............... 370/85.4, 85.5, 85.6, 370/85.12, 85.15, 16, 16.1, 94.1; 340/825.05, 825.5

[56] References Cited

U.S. PATENT DOCUMENTS

| | | | |
|---|---|---|---|
| Re. 31,852 | 3/1985 | Soderblom | 370/90 |
| 4,459,588 | 7/1984 | Grow | 370/85.5 |
| 4,507,777 | 3/1985 | Tucker et al. | 370/16 |
| 4,587,651 | 6/1986 | Nelson et al. | 370/68 |
| 4,597,075 | 6/1986 | Israel | 370/58.2 |
| 4,680,757 | 7/1987 | Murakami et al. | 370/85.4 |
| 4,709,364 | 11/1987 | Hasegawa et al. | 370/85.4 |
| 4,736,368 | 4/1988 | Szczepanek | 370/89 |
| 4,819,229 | 4/1989 | Pritty et al. | 370/85.5 |
| 4,930,122 | 5/1990 | Takahashi et al. | 370/85.15 |
| 5,003,533 | 3/1991 | Watanabe | 370/85.4 |
| 5,070,501 | 12/1991 | Shimizu | 370/85.4 |

OTHER PUBLICATIONS

IEEE Std 802.5-1985 'Token Ring Access Method and Physical Layer Specifications' New York.

Primary Examiner—Douglas W. Olms
Assistant Examiner—Shick Hom
Attorney, Agent, or Firm—Spensley Horn Jubas & Lubitz

[57] ABSTRACT

In a token-ring-type local area network (LAN), a plurality of communication nodes are linked together into a ring by a transmission path, onto which a token used for obtaining a transmission right is circulating through and a frame carrying data is transferred through. Herein, the token has a first memory area for memorizing a ring priority, while the frame has a second memory area for memorizing a reservation priority corresponding to a data priority of the data owned by each communication node. When a current communication node receives the token, the frame is generated and transmitted therefrom without transmitting the token if the data priority is higher than the reservation priority. When the current communication node receives the frame, the data priority of the current communication node is written into the second memory area of the frame if the data priority is higher than the reservation priority. Transmission of the frame is stopped and thereby a new token is generated having the reservation priority of the frame when the data priority of the current node is lower than the reservation priority of the frame which is now transmitted from the current node and then recovered by the current node. Preferably, the frame of data can be transferred in the LAN based on the frame-division manner.

10 Claims, 11 Drawing Sheets

TOKEN-RING-TYPE LOCAL AREA NETWORK

BACKGROUND OF THE INVENTION

1. Field of the Invention

The present invention relates to a token-ring-type local area network (LAN) wherein data transfer is carried out among plural communication nodes which are connected together by a communication link.

2. Prior Art

As the conventional LAN communication method in which information can be treated in real-time manner, the following methods are provided.

(1) Time-Stamp Method

In each communication node, the data is to be transferred with the generation time (i.e., time-stamp) thereof.

(2) Line Switching Method

By use of the line-switching-type LAN which is operated according to the frequency-band-sharing or time-sharing method, one line is assigned between two communication nodes. Herein, at least one line is used to control the line assignment by use of the packet-switching-type protocol.

(3) Token-Passing Method

This is the method in which each communication node obtains the token circulating around the communication path to thereby obtain the transmission right. This method has the following features.

(a) The transmitting node is controlled by the token, by which it is possible to avoid the so-called conflicting transmission states (or collision state) by plural communication nodes.

(b) The period in which the token is retained is limited, by which the tokens are sequentially transferred from one communication node to the next communication node. Thus, each communication node can be operated with an even chance.

(c) By providing a priority to the token, the high-priority data can be transferred at first.

(4) Hybrid Method

This method is characterized by using two different protocols. This method can be further classified into two methods. In a first method, there are provided physically double rings, each having a different real-time response. In a second method, there is provided a single ring, however, there are provided two protocols in which one is operated on a real-time basis and the other is operated on a non-real-time basis. In this case, one of two protocols are adequately used.

Meanwhile, the above-mentioned conventional LAN is constructed for the field of file exchange or keystroke communication of terminals, which do not require the real-time response.

However, especially in the field of the electronic musical instruments and the like, the real-time response is required in order to improve the performance expression. Further, the automatic performance requires the ability to receive large-scale sequence information for the performance from the file server while the sequencer transmits the performance information to the musical instrument. In other words, it requires the real-time response and large-scale communication commonly.

The above-mentioned demand is not limited to the field of the music performance. In short, such demand can be considered as the fundamental demand which must be satisfied in the future LAN.

However, there are some drawbacks by which the conventional LAN cannot respond to such demand sufficiently as follows.

For example, the foregoing time-stamp method (see (1)) can satisfy the demand in case of the recording of the performance.

On the other hand, the foregoing line switching method (see (2)) can directly satisfy the demand, however, there is another drawback in which it is difficult to determine the number of lines to be provided in advance. Because, this method is designed on the basis of the ideal concept in which it is not so affected by the increase of the nodes and the ability thereof is reduced continuously in response to the data quantity.

Further, the packet-switching-type LAN can avoid the transmission collision of plural nodes and also perform the even-chance processing and priority processing, which is superior in the real-time response. Particularly, the token-ring-type LAN is not so affected by the increase of the nodes and the ability thereof is reduced continuously in response to the data quantity.

In this case, the real-time response depends on the period in which the token is retained in each communication node. However, reduction of this period results in a drawback in that the communication efficiency must be reduced when transferring large-scale data.

Moreover, the hybrid method (see (4)), in which the physically double token rings are used, is disadvantageous because of the complicated facility and high cost required. In addition, the method in which two protocols are used is disadvantageous because of the complicated control and difficult maintenance to be required.

Meanwhile, in order to synchronize operations of plural communication nodes with the common clock, one clock source simultaneously supplies the fundamental clock to plural communication nodes in a real-time manner. However, the conventional token-ring-type LAN requires the real-time transfer of the clock. In this case, if an error has occurred, it is impossible to re-transfer the clock. For this reason, the conventional LAN does not provide the efficient error correction, e.g., means for compensating the clock error. Thus, there is a demand to provide the clock sharing method in the LAN.

SUMMARY OF THE INVENTION

It is accordingly a primary object of the present invention to provide a token-ring-type LAN of which the real-time response can be improved without reducing the communication efficiency when transferring large-scale data.

In a first aspect of the present invention, there is provided a token-ring-type local area network (LAN) comprising:

a plurality of nodes each performing data processing; and a transmission path for linking a plurality of nodes together in which a token used for obtaining a transmission right is circulating through and a frame carrying data is transferred through, the token having a first memory area for memorizing a ring priority which is used for a data transmission, while the frame having a second memory area for memorizing a reservation priority corresponding to a data priority representing a priority of data owned by each node, wherein each of the nodes further comprises:

frame generating means which compares the data priority of a current node to the ring priority when the current node receives the token circulating through the transmission path, the frame generating means generating and transmitting the frame from the current node without transmitting the token when a comparison result thereof indicates that the data priority is higher than the reservation priority;

data transmission reserving means which compares the data priority of the current node to the reservation priority when the current node receives the frame transmitting through the transmission path, the data transmission reserving means writing the data priority of the current node into the second memory area of the frame when a comparison result thereof indicates that the data priority is higher than the reservation priority; and token generating means which compares the data priority of the current node to the reservation priority of the frame which is now transmitted from the current node and then recovered by the current node, the token generating means stopping transmission of the frame and thereby generating the token having the reservation priority of the frame when a comparison result thereof indicates that the reservation priority is higher than the data priority.

In a second aspect of the present invention, there is provided a token-ring-type local area network (LAN) comprising:

a plurality of nodes each performing data processing; and a transmission path for linking a plurality of nodes together in which a token used for obtaining a transmission right is circulating through and transmitting data is divided into predetermined data lengths each corresponding to each of frames to be sequentially transferred based on a frame-division transfer, the token having a first memory area for memorizing a ring priority which is used for data transmission, while the frame having a second memory area for memorizing a reservation priority corresponding to a data priority representing a priority of data owned by each node, wherein each of the nodes further comprises:

frame generating means which compares the data priority of a current node to the ring priority when the current node receives the token circulating through the transmission path, the frame generating means generating and transmitting the frame from the current node without transmitting the token when a comparison result thereof indicates that the data priority is higher than the reservation priority;

data dividing means for dividing the data to be transmitted from the current node into a plurality of divided data each having a size smaller than a predetermined size when the transmitting data has a size which is larger than the predetermined size, the divided data being stored in the second memory area, from which frames of the divided data are sequentially transferred;

data transmission reserving means which compares the data priority of the current node to the reservation priority when the current node receives the frame transmitting through the transmission path, the data transmission reserving means writing the data priority of the current node into the second memory area when a comparison result thereof indicates that the data priority is higher than the reservation priority; and token generating means which compares the data priority of the current node to the reservation priority of the frame which is now transmitted from the current node and then recovered by the current node, the token generating means stopping transmission of the frame and thereby generating the token having the reservation priority of the frame when a comparison result thereof indicates that the reservation priority is higher than the data priority.

In a third aspect of the present invention, there is provided a token-ring-type local area network (LAN) comprising:

a plurality of nodes each performing data processing; and a transmission path for linking a plurality of nodes together in which a token used for obtaining a transmission right is circulating through and transmitting data is divided into predetermined data lengths each corresponding to each of frames to be sequentially transferred based on a frame-division transfer, the token having a first memory area for memorizing a ring priority which is used for a data transmission, while the frame having a second memory area for memorizing a reservation priority corresponding to a data priority representing a priority of data owned by each node, wherein each of the nodes further comprises:

frame generating means which compares the data priority of a current node to the ring priority when the current node receives the token circulating through the transmission path, the frame generating means generating and transmitting the frame from the current node without transmitting the token when a comparison result thereof indicates that the data priority is higher than the reservation priority;

data dividing means for dividing the transmitting data to be transmitted from the current node into a plurality of divided data each having a size smaller than a predetermined size when the data priority of the current node is lower than a predetermined priority level, the divided data being stored in the second memory area, from which frames of the divided data are sequentially transferred;

data transmission reserving means which compares the data priority of the current node to the reservation priority when the current node receives the frame transmitting through the transmission path, the data transmission reserving means writing the data priority of the current node into the second memory area when a comparison result thereof indicates that the data priority is higher than the reservation priority; and token generating means which compares the data priority of the current node to the reservation priority of the frame which is now transmitted from the current node and then recovered by the current node, the token generating means stopping transmission of the frame and thereby generating the token having the reservation priority of the frame when a comparison result thereof indicates that the reservation priority is higher than the data priority.

In a fourth aspect of the present invention, there is provided a token-ring-type local area network (LAN) comprising:

a plurality of nodes each performing data processing; and a transmission path for linking a plurality of nodes together in which a token used for obtaining a transmission right is circulating through and transmitting data is divided into predetermined data lengths each corresponding to each of frames to be sequentially transferred based on a frame-division transfer, the token having a first memory area for memorizing a ring priority which is used for a data transmission, while the frame having a second memory area for memorizing a reservation priority corresponding to a data priority representing a priority of data owned by each node, wherein each of the nodes further comprises:

frame generating means which compares the data priority of a current node to the ring priority when the current node receives the token circulating through the transmission path, the frame generating means generating and transmitting the frame from the current node without transmitting the token when a comparison result thereof indicates that the data priority is higher than the reservation priority;

data dividing means for dividing the transmitting data to be transmitted from the current node into a plurality of divided data each having a size smaller than a predetermined size when the transmitting data has a size larger than the predetermined size, the divided data being stored in the second memory area, from which frames of the divided data are sequentially transferred;

data transmission reserving means which compares the data priority of the current node to the reservation priority when the current node receives the frame transmitting through the transmission path, the data transmission reserving means writing the data priority of the current node into the second memory area when a comparison result thereof indicates that the data priority is higher than the reservation priority;

token generating means which compares the data priority of the current node to the reservation priority of the frame which is now transmitted from the current node and then recovered by the current node, the token generating means stopping transmission of the frame, thereby storing the reservation priority of the frame therein and also generating the token having the reservation priority of the frame when a comparison result thereof indicates that the reservation priority is higher than the data priority; and priority operating means which compares the ring priority to the reservation priority stored in the token generating means when the current node receives the token circulating through the transmission path, the priority operating means recovering the ring priority of the token operated by the current node to its original priority level and thereby re-starting to transmit the frame from the current node when a comparison result thereof indicates that both of the ring priority and reservation priority coincide with each other.

In a fifth aspect of the present invention, there is provided a token-ring-type local area network (LAN) comprising:

a plurality of nodes each performing a data processing; and a transmission path for linking a plurality of nodes together in which a token used for obtaining a transmission right is circulating through and transmitting data is divided into predetermined data lengths each corresponding to each of frames to be sequentially transferred based on a frame-division transfer, the token having a first memory area for memorizing a ring priority which is used for a data transmission, while the frame having a second memory area for memorizing a reservation priority corresponding to a data priority representing a priority of data owned by each node, wherein each of the nodes further comprises:

frame generating means which compares the data priority of a current node to the ring priority when the current node receives the token circulating through the transmission path, the frame generating means generating and transmitting the frame from the current node without transmitting the token when a comparison result thereof indicates that the data priority is higher than the reservation priority;

data dividing means for dividing the data to be transmitted from the current node into a plurality of divided data each having a size smaller than a predetermined size when the data priority of the current node is lower than a predetermined priority level, the divided data being stored in the second memory area, from which frames of the divided data are sequentially transferred;

data transmission reserving means which compares the data priority of the current node to the reservation priority when the current node receives the frame transmitting through the transmission path, the data transmission reserving means writing the data priority of the current node into the second memory area when a comparison result thereof indicates that the data priority is higher than the reservation priority;

token generating means which compares the data priority of the current node to the reservation priority of the frame which is now transmitted from the current node and then recovered by the current node, the token generating means stopping transmission of the frame, thereby storing the reservation priority of the frame therein and also generating the token having the reservation priority of the frame when a comparison result thereof indicates that the reservation priority is higher than the data priority; and priority operating means which compares the ring priority to the reservation priority stored in the token generating means when the current node receives the token circulating through the transmission path, the priority operating means recovering the ring priority of the token operated by the current node to its original priority level and thereby re-starting to transmit the frame from the current node when a comparison result thereof indicates that both of the ring priority and reservation priority coincide with each other.

In a sixth aspect of the present invention, there is provided a clock sharing method for use in a ring-type LAN comprising steps of:

connecting each of timers to each of a plurality of communications nodes, in which one of the timers is set as a fundamental timer for generating a fundamental clock;

transmitting sequence number data corresponding to the fundamental clock from the communication node coupled with the fundamental timer;

incrementing the sequence number every time the sequence number data is transmitted;

setting an expected value corresponding to the sequence number in advance for each of the communication nodes other than the communication node coupled with the fundamental timer;

judging whether or not a transmission error has occurred based on a difference between the expected value and the sequence number received in each communication node; and correcting a count value of the timer coupled to the communication node which judges that the transmission error has occurred based on the difference between the expected value and received sequence number.

In a seventh aspect of the present invention, there is provided a communication node managing method for use in a ring-type LAN comprising steps of:

setting a predetermined one of a plurality of communication nodes as a transmitting node which transmits a data accompanied with its specific address by every predetermined period;

replacing the address of the data received in a lower-stream node provided in a lower-stream of the transmitting node by a specific address of the lower-stream node;

transmitting the data from the lower-stream node;

recovering the data circulating through the ring once by the transmitting node; and inputting the address of the recovered data into the transmitting node, thereby managing the communication nodes.

In an eighth aspect of the present invention, there is provided a ring-type LAN comprising:

a data input/output terminal through which data is inputted or outputted, the data input/output terminal being provided for each communication node;

a control signal input/output terminal through which a control signal for controlling a data input/output operation is inputted or outputted, the control signal input/output terminal being provided for each communication node; and a peripheral unit coupled to each communication node, the peripheral unit having an interface which can be connected to the data input/output terminal and the control signal input/output terminal of each communication node, whereby data supplied to the peripheral unit is transferred among a plurality of communication nodes.

In a ninth aspect of the present invention, there is provided a priority setting method for use in a token-ring-type LAN comprising steps of:

transferring a token or a frame onto the transmission path and circulating the token or frame through the communication nodes;

setting a first priority representative of a current priority of the token or frame, a second priority which is used to make a reservation of a data transfer in response to a data priority of data existed in a current communication node and a third priority corresponding to a change of the first priority to be stored in the communication node which changes the first priority, each of the first, second and third priorities being represented by data of N bits (where N denotes an integral number) so that each priority has (N+1) stages of priority levels;

assigning data of N bits concerning the first and second priorities into formats of the token and frame;

judging a current priority level based on firstly set bit of the first and third priorities in view of their most significant bit;

setting a bit corresponding to the data priority within N bits of the second priority of the token or frame to be transferred, thereby making a reservation of the data transfer;

setting or resetting the same bit for the first priority of the token or frame to be transferred and the third priority stored in the current communication node, thereby changing the first priority; and recognizing that the current communication node changed the first priority when the first priority of the token recovered by the current communication node is identical to the third priority stored in the current communication node.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Figure 1:
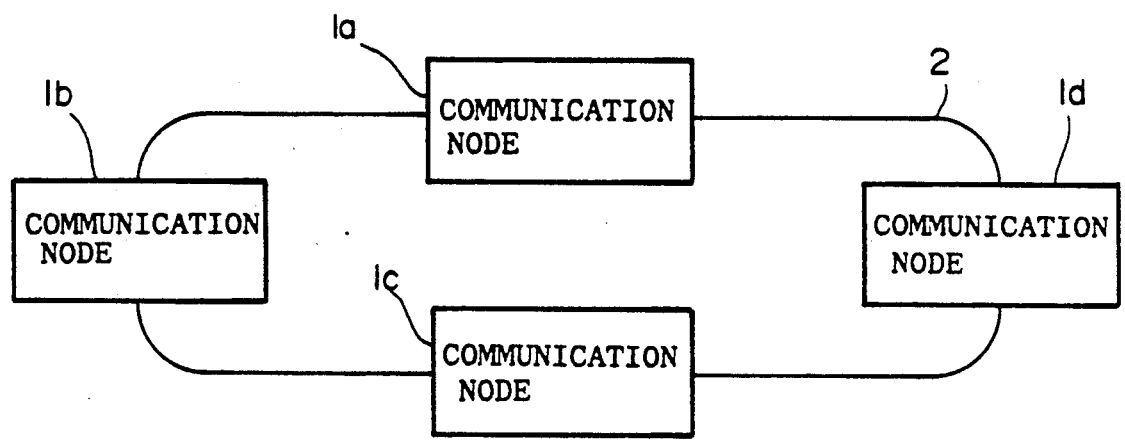
FIG. 1 is a block diagram showing a whole configuration of a token-ring-type LAN according to a first embodiment of the present invention.

Before describing the preferred embodiments of the present invention in detail, description will be given with respect to the fundamental concept for resolving the drawbacks of the conventional LAN.

At first, the token-ring method (e.g., token-passing method described before) is employed as the communication method of the LAN. In this method, the real-time response depends on the token retaining period of each communication node as described before. In order to shorten such token retaining period, each frame of the data must be reduced as small as possible when transferring the data.

However, under consideration of the communication efficiency to be produced at a time when transferring large-scale data, it is necessary to transfer the data as much as possible when obtaining one token.

Incidentally, in general, relatively long data length is set for the data having the low priority, while relatively short data length is set for the data having the high priority.

Thus, the present invention introduces three transfer methods, i.e., the frame-division transfer method, multi-frame transfer method and frame-interrupt transfer method. Herein, the long frame of data is divided into some short frames when transferring the data in the frame-division transfer method, while plural frames of data are continuously transferred after obtaining a token in the multi-frame transfer method. In the frame-interrupt transfer method, certain frames of data which are required to be transferred in real-time are interruptedly inserted into the data which are being transferred by the foregoing frame-division transfer method or multi-frame transfer method.

At first, the transmission data is classified into low-priority data or high-priority data. In the transmission node, low-priority data is divided into some short frames, which are transferred by the multi-frame transfer method. In the receiving node, short frames of data are combined together into the original frame of data. In other communication nodes, a frame of the high-priority data is interruptedly inserted between the frames of data which are transferred by the frame-division transfer method. This interruption does not affect the frame-division transfer at all.

By employing the above-mentioned transfer system, it is possible to easily improve the real-time response without reducing the communication efficiency when transferring large-scale data.

Next, description will be given with respect to the method of setting the boundary priority which is used to classify the priority of the transmission data into the aforementioned low priority and high priority. In the case where there are provided many kinds of data each having the long data length, i.e., in the case where there are provided a plurality of priorities for the data to be subject to the frame-division transfer, the highest priority among these priorities is set as the boundary priority. Then, the priority of a certain frame of data which is subject to the frame-division transfer in a certain communication node is changed to the boundary priority, so that the certain frame of data is transferred with the boundary priority. This avoids the frame-division transfer of the other frame of data of which priority is higher than that of the certain frame of data. In other words, it is possible to avoid the conflicting state of the frame-division transfer, by which the data processing can be simplified.

Incidentally, when the high priority is reserved during execution of the frame-division transfer, the corresponding communication node may interrupt the frame-division transfer thereof. In this case, in order to re-start the frame-division transfer, the communication node is required to state that the data having the boundary priority has existed therein. Because, the fact in which a certain communication node has the data having a certain priority lower than the boundary priority indicates that another communication node has the data having the priority higher than the certain priority. In this case, if another communication node has the data having the priority by which the frame-division transfer can be made, it obtains the token to thereby start the frame-division transfer. When the communication node which interrupts the frame-division transfer obtains the token having the boundary priority, it is necessary to carry out the frame-division transfer on the remaining frames of the data without executing the temporary release of such token which is executed by the conventional LAN.

Incidentally, it is possible to change the boundary priority to another priority or it is possible to prevent the data having the boundary priority from being transferred. In this case, as similar to the conventional LAN, it is possible to execute the temporary release of the token having the boundary priority after obtaining such token. Herein, the data having the boundary priority is to be transferred with the priority which level is lowered or raised from the boundary priority by one level.

Next, description will be given with respect to the formats for the token and frame to be used in the present invention.

(a) Token Format: SD, AC, ED

Herein, SD indicates a starting delimiter (1 octet) representative of the start point of the token; AC indicates an access control (1 octet) having all of the information concerning the transmission right, information for the transmission reservation, information used the distinction between the token and frame and information of the priority; and ED indicates an ending delimiter (1 octet) representative of the ending point of the token.

(b) Frame Format: SD, AC, FC DA, SA, INFO, FCS, ED, FS

Herein, SD indicates a staring delimiter (1 octet) representative of the starting point of the frame; AC indicates an access control (1 octet) having all of the information concerning the priority of frame and reservation receipt from the other communication nodes and information used for the distinction between the token and frame; and FC indicates a frame control (1 octet) having the information concerning the frame type and frame-division transfer.

In addition, DA and SA respectively indicate the destination address and sending address (2 octet) for the data to be transmitted; and INFO indicates the data portion to be transmitted, by which information the data of 0 to 136 octet can be transferred with respect to one frame. In order to guarantee the real-time response, the maximum length of one frame is limited to 136 octet corresponding to INFO field.

Further, FCS indicates a frame check sequence (4 octet). This information is used to check whether or not any information is missed or varied during the frame transfer. Herein, the start frame sequence and end frame sequence are excluded from all of the frame information, so that this checking operation is carried out on the other information, i.e., FC, DA, SA, INFO.

Moreover, ED indicates an ending delimiter (1 octet) representative of the frame end; and FS indicates a frame status (1 octet) having the information representing the event whether or not the frame is read in. Therefore, FS is used for the malfunction judgement.

Next, detailed description will be given with respect to the access control (AC) and frame control (FC) within the aforementioned token format and frame format, which particularly relate to the present invention.

(a) Access Control (AC): $P_3$, $P_2$, $P_1$, T, M, $R_3$, $R_2$, $R_1$ (i) Pi (where i=1 to 3) indicates a priority index bit, which further represents the priority for the token or frame on the LAN ring. Hereinafter, this priority is simply referred to as a ring priority Pr.

An Example of this ring priority Pr is described below:

| $P_3$ | $P_2$ | $P_1$ | |
|---|---|---|---|
| 0 | 0 | 0 | ring priority (0) |
| 0 | 0 | 1 | ring priority (1) |
| 0 | 1 | $h_1$ | ring priority (2) |
| 1 | $h_2$ | $h_1$ | ring priority (3) |

In the above-mentioned example, the ring priority is divided into four levels, wherein the lowest priority level corresponds to "000". In this case, the frame having the lowest priority level can be subject to the frame-division transfer, however, the frames having the other priority levels cannot be subject to the frame-division transfer. In short, there is provided only one priority level which can be subject to the frame-division transfer. However, the frames having the higher priority levels can be interruptedly inserted into the data which are now subject to the frame-division transfer. In this case, the frame-division transfer is temporarily interrupted, the frame having the higher priority level is transferred, and then the frame-division transfer is restarted.

Incidentally, the higher priority level depends on the bits $P_3$, $P_2$, $P_1$, wherein the highest priority level corresponds to $P_3=1$. In view from the MSB side, i.e., leftmost bit ($P_3$) side, the first bit at which "1" is set indicates the priority level.

In the case where the higher priority is reserved for the reservation index (which will be described later) of the token or frame which is now transferring, the sending communication node publishes the token or frame having the higher priority. This publication can be made by merely setting "1" at the left side of the data string having the priority before being varied. Therefore, it is possible to retain the priorities before being varied for the foregoing priority indexes $h_1$, $h_2$ as their history priority. After a certain communication node completely transfers the frame having the higher priority, such communication node returns the operated bit to the token having the history priority, which will be released afterwards. If no history priority is existed, the token having the ring priority "000" is to be produced.

(ii) T indicates a token bit. Herein, T="0" represents the token, while T="1" represents the frame.

(iii) M indicates a monitor bit which is used to check the frame or token, by which the frame or token having the priority higher than the ring priority "000" is prevented from circulating through the LAN ring.

(iv) Ri (where i=1 to 3) indicates a reservation index bit representative of a reservation priority Rr.

An example of this reservation index is described below:

| $R_3$ | $R_2$ | $R_1$ | |
|---|---|---|---|
| 0 | 0 | 0 | no reservation |
| 0 | 0 | 1 | reservation priority (1) |
| 0 | 1 | X | reservation priority (2) |
| 1 | X | X | reservation priority (3) |

Herein, "X" can be set by either "1" or "0".

In order to obtain the next frame publication right, the communication node having the data of higher priority sets the bit corresponding to that priority within the reservation index bits. Then, the communication node which recovers the frame checks the reservation index bits within the recovered frame to thereby publish the token in which the reservation index bit (i.e., the leftmost bit within three bits) corresponding to the priority of the recovered frame is set to the bit corresponding to the ring priority Pr.

In other words, as similar to the ring priority Pr, the reservation priority Rr is judged by the MSB side, i.e., leftmost bit ($R_3$). Therefore, even if plural bits are set for the reservation index, only the leftmost bit is used and the other bits are neglected.

(b) Frame Control (FC): $F_1$, $F_0$, Df, Dns, Dne, $SD_3$, $SD_2$, $SD_1$ (i) Fi (where i=1, 2) indicates the frame index bit. Herein, Fi at "00" indicates a media access control (MAC) frame representative of the information used for the management of the network; Fi at "01" indicates an upper-level logic link control (LLC) frame; and Fi at "1X" is not defined.

(ii) Df at "0" indicates a non-dividing frame, while Df at "1" indicates a dividing frame.

(iii) Dns, Dne at "00" indicates the non-dividing frame; Dns, Dne at "01" indicates the head frame within the dividing frame; Dns, Dne at "10" indicates the end frame within the dividing frame; and Dns, Dne at "11" indicates the middle frame within the dividing frame.

(iv) SDi (where i=1 to 3) indicates a data priority Pm when Df=0. Herein, the data priority Pm does not indicate the ring priority index used for the actual transfer of the data on the ring, but it indicates the priority of the data itself.

In this case, the data having the priority which is higher than the priority index of the token is to be transferred with the priority Pr of the token on the ring. Therefore, the priority of the data cannot be transmitted to the destination node with accuracy. However, by use of the data priority Pm having the true priority of the data to be transferred, it is possible to transmit the priority of the data with accuracy.

As similar to the foregoing ring priority Pr and reservation priority Rr, this data priority Pm has four priority levels, wherein "100" corresponds to the highest priority level.

Meanwhile, SDi (where i=1 to 3) indicates the dividing sequence when Df=1. This is used to check the missing of any dividing frame while the frame-division transfer is performed. Herein, the head frame corresponds to "000", of which value is incremented in accordance with the frame number. When reaching "111", this is returned to "000" again.

Next, description will be given with respect to the preferred embodiments of the present invention by referring to the drawings, wherein like reference characters designate like or corresponding parts throughout the several views.

[A] FIRST EMBODIMENT (1) Configuration

FIG. 1 is a block diagram showing the whole configuration of the token-ring-type' LAN according to the first embodiment of the present invention. In FIG. 1, 1a to 1d designate respective communication nodes, and 2 designates a transmission path through which these communication nodes 1a to 1d are linked together in the ring-shape communication link. Herein, the transmission path 2 can be made of the shield twist-pair line, optical filter cable or the like.

Figure 2:
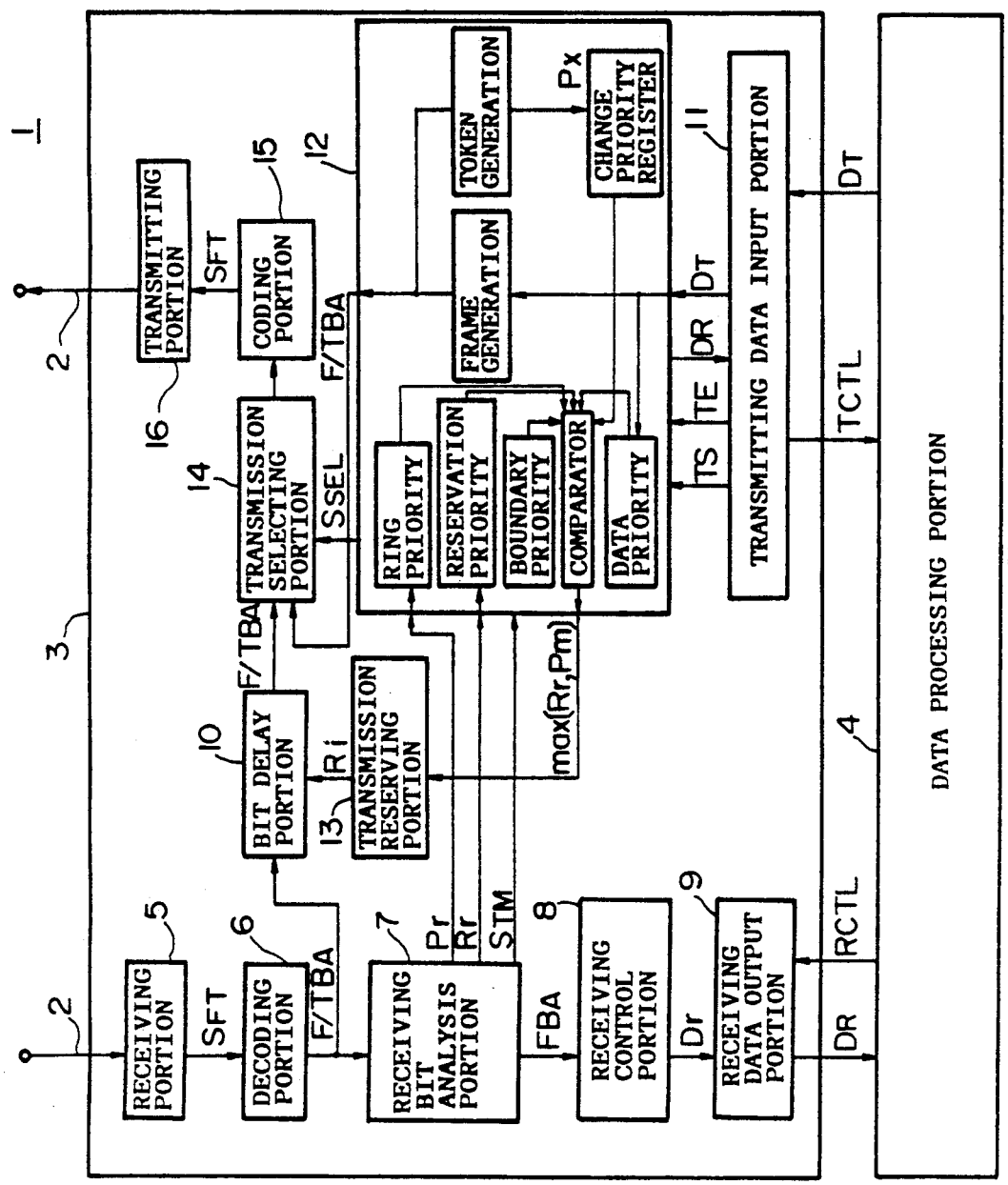
FIG. 2 is a block diagram showing a detailed configuration of each communication node shown in FIG. 1.
Figure 3:
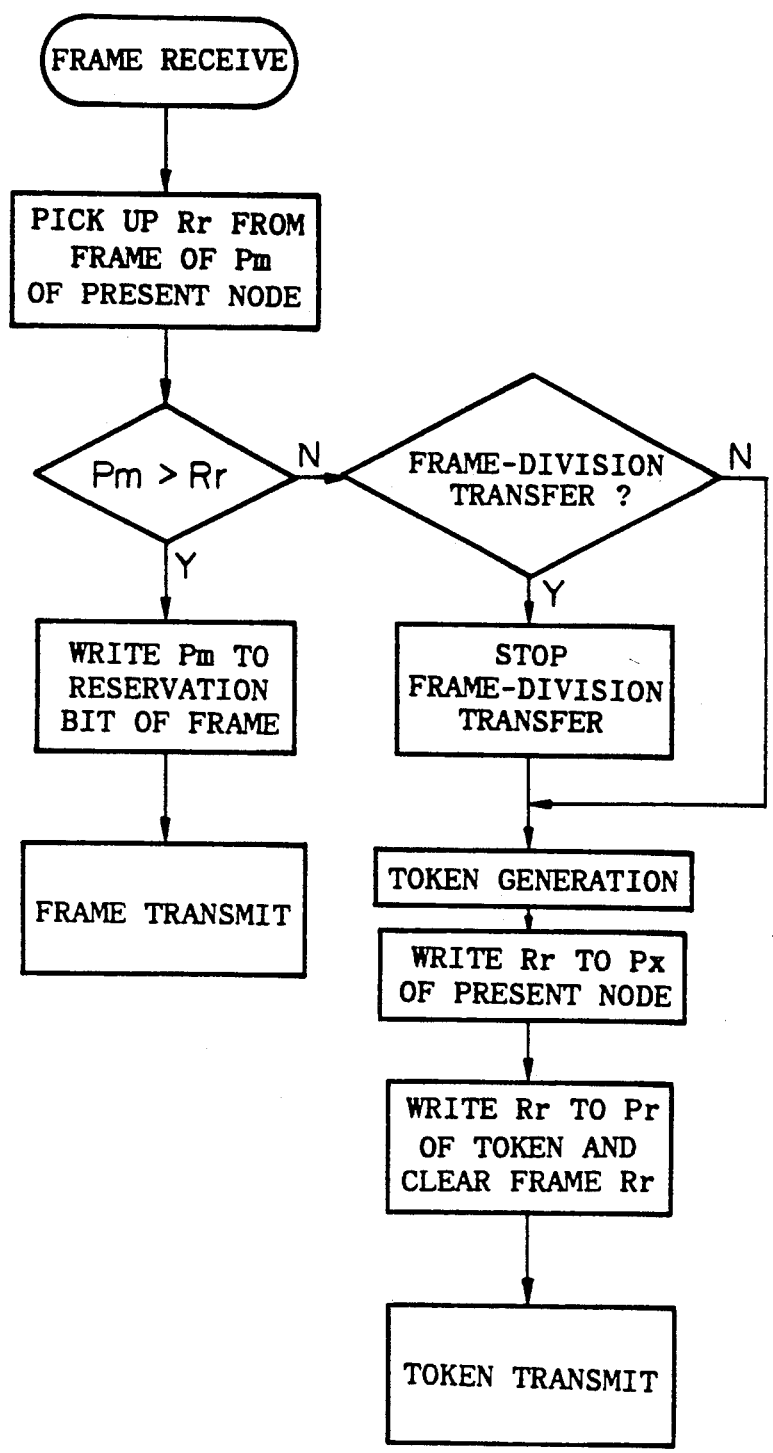
FIGS. 3 and 4 are flowcharts showing operations of the first embodiment of the present invention.

FIG. 2 is a block diagram showing the detailed configuration of each communication node 1. In FIGS. 2, 3 designates a LAN connecting portion to be connected to the transmission path 2. This LAN connecting portion 3 performs an input/output control on transmission signals $S_{FT}$ with respect to another communication node. In addition, 4 designates a data processing portion which processes received data $D_R$ and transmitting data $D_T$, wherein $D_R$ designates the data which is received by the LAN connecting portion 3 and then decoded, while $D_T$ designates the data which is to be sent to another communication node.

In the LAN connecting portion 3, 5 designates a receiving portion which receives the signal $S_{FT}$ to be transferred thereto via the transmission path; 6 designates a decoding portion which decodes a frame/token bit string $F/TB_A$ from the signal $S_{FT}$; and 7 designates a receiving bit analysis portion. This receiving bit analysis portion 7 always checks the frame/token bit string $F/TB_A$ to thereby detect a timing signal $S_{TM}$ concerning its start/end timings. In addition, this portion 7 detects and produces the ring priority Pr and reservation priority Rr, and it also outputs a frame bit string FB$_A$.

Further, 8 designates a receiving control portion which inputs the frame bit string FB$_A$ to thereby judge whether or not this frame bit string FB$_A$ is sent to the present communication node 1. In addition, this receiving control portion 8 makes up receiving data D$_R$ from the frame bit string FB$_A$ which was transferred thereto in the frame-division manner, thereby outputting receiving data D$_R$ to be sent for the present communication node. Furthermore, 9 designates a receiving data output portion which input and then outputs the receiving data D$_R$ to the data processing portion 4 based on a receiving control signal RCTL.

Moreover, 10 designates a bit delay portion which rewrites some bits during the relay transmission of the frame/token bit string F/TB$_A$; and 11 designates a transmitting data input portion which inputs the transmitting data D$_T$ and a transmission control signal TCTL from the data processing portion 4 to thereby output this transmitting data D$_T$ based on TCTL. In addition, 12 designates a transmission control portion which produces the token bit string TB$_A$. Based on a transmission start signal TS and a transmission end signal TE outputted from the transmitting data input portion 11, the transmission control portion 12 outputs a data request signal DR to the transmitting data input portion 11 to thereby input the transmitting data D$_T$ therein. Then, the transmission control portion 12 produces and outputs the frame bit string FB$_A$ in accordance with the protocol of the token ring. Herein, production of the frame bit string FB$_A$ is made based on the data priority Pm to be extracted from the transmitting data D$_T$ and ring priority Pr, reservation priority Rr and timing signal S$_{TM}$ to be outputted from the receiving bit analysis portion 7.

In addition, 13 designates a transmission reserving portion which receives the higher one of the reservation priority Rr and data priority Pm outputted from the transmission control portion 1, which will be referred to as "max[Rr,Pm]" hereinafter. In this case, the transmission reserving portion 13 sets the reservation index bit Ri for the frame/token bit string F/TB$_A$ which corresponds to the leftmost bit within three bits of the inputted priority, i.e., max[Rr,Pm], and which is now passing through the bit delay portion 10. And, 14 designates a transmission selecting portion which selectively outputs one of two frame/token bit strings F/TB$_A$ to be outputted from the bit delay portion 10 and transmission control portion 12 respectively. Incidentally, this selection is made based on a selecting signal S$_{SEL}$ to be outputted from the transmission control portion 12.

Further, 15 designates a coding portion which codes the frame/token bit string F/TB$_A$ outputted from the transmission selecting portion 14. And, 16 designates a transmitting portion which transmits the output signal S$_{FT}$ of the coding portion 15 via the transmission path 2 to another communication node different from the present communication node.

(2) Operation

Next, description will be given with respect to the operation of the present embodiment by referring to FIGS. 3 and 4.

First, description will be given with respect to the case where the communication node 1a transfers the data priority Pm (="000") to another communication node 1c in the frame-division transfer manner. Incidentally, boundary priority Pth has the priority level "000" because there is only one priority level "000" provided for the frame-division transfer. In addition, the transmission control portion 12 performs the control of the frame-division transfer. In the communication node 1a, when the transmitting data D$_T$ produced in the data processing portion 4 and transmitted via the transmitting data input portion 11 has the data priority Pm at "000" and the transmission data length thereof exceeds the maximum length of one frame (i.e., 136 octet), the transmission control portion 12 divides the transmitting data D$_T$ into plural frame bit strings FB$_A$, which are to be transferred therefrom.

Incidentally, the first frame bit string FB$_A$ obtains the token by use of the data priority Pm. i.e., priority level "000", to be extracted from the original transmitting data D$_T$ thereof. Meanwhile, the token is received by the receiving portion 5 and detected and then produced by the decoding portion 6 and receiving bit analysis portion 7. Therefore, when the ring priority Pr of the token has the priority level "000", i.e., when this ring priority Pr is not higher than the data priority Pm of the present communication node, the first frame bit string obtains such token. As for the second and other frame bit strings FB$_A$, the data priority is changed to the boundary priority Pth. In this case, however, the data priority is not changed and outputted as it is, because the boundary priority Pth is identical to the priority which can be subject to the frame-division transfer.

As described above, the communication node 1a obtains the token which circulates through the transmission path 2. Thus, this communication node 1a obtains the transmission right by which the data can be transmitted to the transmission path 2. Then, the transmission control portion 12 within the communication node 1a changes the obtained token to the frame start sequence, which is further added with the control field, address field, information field, frame check sequence and frame end sequence. Thereafter, such data is outputted with the selecting signal S$_{SEL}$ as the frame bit string FB$_A$. In this case, the head frame of the data which is subject to the frame-division transfer has the following access control (AC) and frame control (FC).

| 0 | 0 | 0 | 1 | 0 | 0 | 0 | 0 | ... (AC) |
| 0 | 1 | 1 | 0 | 1 | 0 | 0 | 0 | ... (FC) |

Then, the transmission selecting portion selects the frame bit string FB$_A$ outputted from the transmission control portion 12. The coding portion 15 codes the selected frame bit string into the data, which is transmitted through the transmitting portion 16 as the signal S$_{FT}$.

Thus, this signal S$_{FT}$ is transferred from the present communication node 1a to its adjacent communication node 1b. The receiving portion 5 of the communication node 1b receives the signal S$_{FT}$ transmitted thereto via the transmission path 2. In this communication node 1b, the decoding portion 6 decodes this signal S$_{FT}$, thereafter, the receiving bit analysis portion 7 detects the timing signal S$_{TM}$, it also detects and produces the ring priority Pr and reservation priority Rr and then outputs the frame bit string FB$_A$.

Further, the receiving control portion 8 judges whether or not the inputted frame bit string FB$_A$ is truly sent to the communication node 1b thereof. In this case, such frame bit string is not intended to be sent to the communication node 1b, which therefore does not make up and output the receiving data $D_T$.

Next, the bit delay portion 10 rewrites some bits of the frame bit string $FB_A$ which is now relayed thereby. Now, description will be given with respect to the case where the communication node 1b has the transmitting data $D_T$ to be transferred to the communication node 1d having the data priority Pm="001". In this case, the priority data max[Rr,Pm] outputted from the transmission control portion 12 is inputted into the transmission reserving portion 13 wherein "1" set at the leftmost bit within three bits of such priority data is set to the reservation index bit Ri within the frame/token bit string $F/TB_A$ which is now passing through the bit delay portion 10. Incidentally, a concrete example of the access control (AC) of the frame bit string $FB_A$ is described as follows, wherein "-" indicates the bit which value is not changed.

$$- - - - - - 1 \qquad (AC)$$

At this time, the current communication node 1b does not transmit the data therefrom. Therefore, the transmission selecting portion 14 selects the frame bit string $FB_A$ outputted from the bit delay portion 10, which is then coded by the coding portion 15 and then transmitted via the transmitting portion 16 as the signal $S_{FT}$.

Thus, the signal $S_{FT}$ is transferred to the communication node 1c from the communication node 1b. In the communication node 1c, the receiving portion 5 receives the signal $S_{FT}$ which is transferred thereto via the transmission path 2. After being decoded in the decoding portion 6, this signal is supplied to the receiving bit analysis portion 7 wherein the timing signal $S_{TM}$ is detected, the ring priority Pr and reservation priority Rr are detected and produced and the frame bit string $FB_A$ is to be outputted.

Further, the receiving control portion 8 judges whether or not the inputted frame bit string $FB_A$ is intended to be sent to the current communication node 1c. In this case, such frame bit string is intended to be sent to the current communication node 1c, which therefore makes up and outputs the receiving data $D_R$ from the frame of data transferred thereto in the frame-division manner. Next, the receiving data output portion 9 inputs the receiving data $D_R$ and then outputs it to the data processing portion 4 based on the receiving control signal RCTL outputted from the data processing portion 4.

Next, the bit delay portion 10 rewrites some bits of the frame bit string $FB_A$ which is now relayed thereby. Now, description will be given with respect to the case where the communication node 1c has the transmitting data $D_T$ to be transferred to the communication node 1b having the data priority Pm="010". In this case, in the communication node 1c, the priority data max[Rr,Pm] outputted from the transmission control portion 12 is inputted into the transmission reserving portion 13 wherein "1" set at the leftmost bit within three bits of such priority data is set to the reservation index bit Ri of the frame/token bit string $F/TB_A$ which is now passing through the bit delay portion 10. Herein, a concrete example of the access control (AC) of the frame bit string $FB_A$ is described as follows:

$$- - - - - - 1 1 \qquad (AC)$$

In this case, the current communication node 1c does not intend to transmit the data therefrom. Therefore, the transmission selecting portion 14 selects the frame bit string $FB_A$ outputted from the bit delay portion 10. After being coded by the coding portion 15, it is transmitted onto the transmission path 2 via the transmitting portion 16.

Incidentally, the operation of the communication node 1b is as similar to that of the communication node 1d, therefore, which description will be omitted.

Next, the communication node 1a detects and produces the ring priority Pr and reservation priority Rr from the signal $S_{FT}$ transferred thereto via the transmission path 2.

In the communication node 1a, the transmission control portion 12 receives the ring priority Pr and reservation priority Rr from the from the receiving bit analysis portion 7, wherein Pr="000" and Rr="011". Now, description will be given with respect to the case where the transmitting data $D_T$ having the data priority Pm="000" only existed in the communication node 1a.

In this case, the reservation priority Rr is the largest among the priorities Rr, Pm and Pr. Therefore, transmission control portion 12 of the communication node 1a stops the frame-division transfer and then sets the reservation priority Rr to the corresponding bit in the ring priority index of the access control (AC). Then, the transmission control portion 12 produces the token bit string $TB_A$ in which all of the reservation index bits are rewritten to "0". Herein, a concrete example of the access control (AC) of the token bit string $TB_A$ is described as follows:

$$0 1 1 0 0 0 0 0 \qquad (AC)$$

At this time, the transmission control portion 12 sets one or more bits corresponding to the changed priority within the change priority Px of three bits to be stored in the change priority register thereof. In this case, this change priority Px is set as "011".

Meanwhile, during the period in which the communication node 1a transfers the frame of data having the priority level "000" to the communication node 1c in the frame-division transfer manner, the communication node 1a recovers such frame of data to thereby compares its ring priority Pr, reservation priority Rr and the data priority Pm to each other in the transmission control portion 12 thereof. In this case, the communication node 1a continues the frame-division transfer when the above comparison result indicates that all of the priorities Pr, Rr, Pm are at "000", representing that no reservation is made in other communication nodes 1b to 1d and no transmitting data $D_T$ having a high priority is existed in the communication node 1a. Herein, a concrete example of the access control (AC) of the frame of data is described as follows:

$$- - - 1 0 0 0 0 \qquad (AC)$$

Now, when the frame-division transfer is interrupted and new token bit string $TB_A$ is produced, as similar to the above-mentioned frame-division transfer, such new token bit string $TB_A$ is decoded to the signal $S_{FT}$, which is transferred to the communication nodes 1b, 1c from the communication node 1a. Incidentally, the high-priority reservation is not made in the communication node 1b at this time.

Based on the token to be transferred via the transmission path 2, the communication node 1c detects and produces the ring priority Pr and reservation priority Rr.

Next, in the communication node 1c, the transmission control portion 12 receives the ring priority Pr and reservation priority Rr from the receiving bit analysis portion 7, wherein Pr="011" and Rr="000". Now, description will be given with respect to the case where only the transmitting data $D_T$ having the data priority Pm="010" existed in the communication node 1c.

In this case, among the priorities Rr, Pm, Pr, the ring priority Pr is identical to the data priority Pm. In other words, the ring priority Pr is not higher than the data priority Pm, therefore, the communication node 1c will obtain the corresponding token.

Thus, the communication node 1c obtains the transmission right, so that the transmission control portion 12 thereof converts the token into the frame start sequence, which is further added to the control field, address field, information field, frame check sequence and frame end sequence. Thereafter, it is outputted as the frame bit string $FB_A$ with the selecting signal $S_{SEL}$.

Therefore, the transmission selecting portion 14 selects the frame bit string $FB_A$ outputted from the transmission control portion 12. After being coded by the coding portion 15, it is transmitted onto the transmission path 2 via the transmitting portion 16 as the signal $S_{FT}$. Herein, a concrete example of the access control (AC) of the frame bit string $FB_A$ is described as follows. Incidentally, in order to acknowledge the new reservation state, all of the reservation index bits within the frame bit string $FB_A$ are set at "0". In this case, however, no reservation is made so that the above-mentioned operation of setting the reservation index bits at "0" does not substantially affect the result.

```
---10000                                    (AC)
```

Thus, the signal $S_{FT}$ is transferred to the communication node 1d from the current communication node 1c.

Then, this signal $S_{FT}$ passes through the communication nodes 1d, 1a and reaches the destination thereof, i.e., communication node 1b. Thereafter, it is recovered by its sending communication node 1c as described before, which description will be omitted. Incidentally, during the frame transfer, it is assumed that no reservation is made at all in the communication node.

Next, the communication node 1c detects and produces the ring priority Pr and reservation priority Rr from the token transmitted thereto via the transmission path 2.

In the communication node 1c, the transmission control portion 12 receives the ring priority Pr and reservation priority Rr from the receiving bit analysis portion 7, wherein Pr="011". Now, description will be given with respect to the case where only the transmitting data $D_T$ having the data priority Pm="000" is existed in the communication node 1c.

In this case, among the priorities Rr, Pm, Pr, the ring priority Pr is the highest. Therefore, the transmission control portion 12 of the communication node 1c uses the ring priority Pr as it is, and this transmission control portion 12 produces the token bit string $TB_A$. Herein, the value corresponding to the data priority Pm is set to the reservation index bit of the access control (AC) of this token bit string $TB_A$. A concrete example of the access control (AC) of this token bit string $TB_A$ is described as follows:

```
01100000                                    (AC)
```

As described before, the newly produced token bit string $TB_A$ is decoded and then transferred to the communication nodes 1d, 1a from the communication node 1c as the signal $S_{FT}$. In this case, no high-priority reservation is made in the communication node 1d.

Then, the communication node 1a detects and produces the ring priority Pr and reservation priority Rr from the token transferred thereto via the transmission path 2.

In the communication node 1a, the transmission control portion 12 receives the ring priority Pr and reservation priority Rf from the receiving bit analysis portion 7, wherein Pr="011" and Rr="000". Now, description will be given with respect to the case where only the transmitting data $D_T$ having the data priority Pm="000" existed in the communication node 1a. Herein, the change priority Px is set at "011".

In this case, the left bit position of the data priority Pm at which "1" is set is identical to that of the change priority Px. Therefore, the communication node 1a resets the ring priority Pr corresponding to such bit position of the change priority Px, and it also resets such bit of the change priority Px.

Thus, the ring priority Pr, reservation priority Rr, data priority Pm and change priority Px are set such that Pr="001", Rr="000", Pm="000", Px="001". Then, the communication node 1b operates as similar to the communication node 1c. Thereafter, the communication node 1a operates again as described before.

Next, the transmission control portion 12 of the communication node 1a compares the new ring priority Pr, reservation priority Rr and data priority Pm together. At this time, all of these priorities are at "000", therefore, they are not changed any more. Incidentally, the communication node 1a has broken the frame-division transfer before. At this time, however, the communication node 1a restarts the frame-division transfer without producing the token bit string $TB_A$. This frame-division transfer is carried out as described before.

Figure 4:
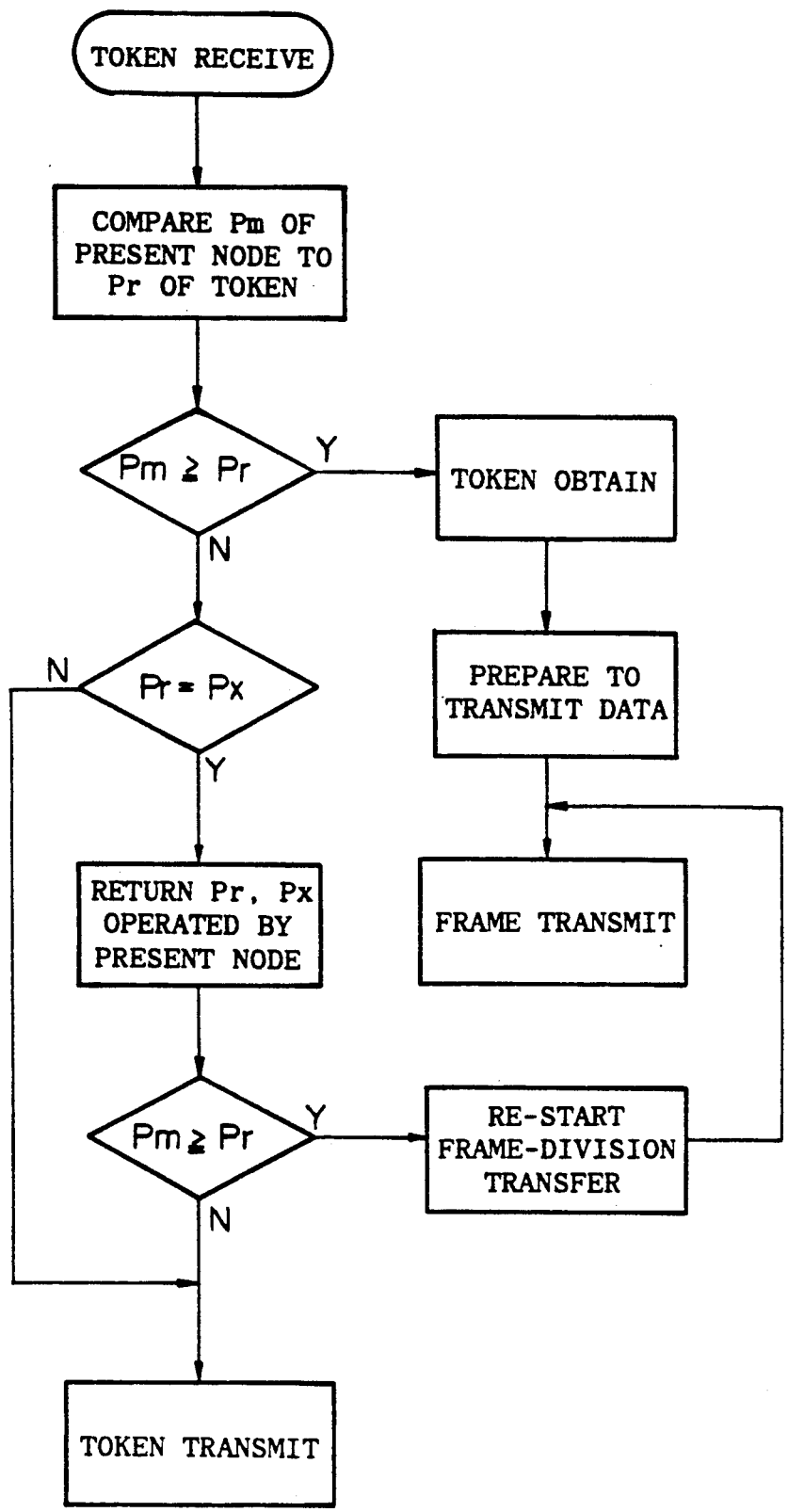

FIGS. 3 and 4 are flowcharts showing the operations of the communication node, i.e., the operation when receiving the frame and another operation when receiving the token.

In the first embodiment as described above, if the transmitting data $D_T$ having the data priority Pm (e.g., "100") is existed in the communication node 1a, the bit corresponding to the data priority Pm is set at "1" and all of the reservation index bits are set at "0" in each of the ring priority Pr and change priority Px.

As described above, according to the first embodiment of the present invention, it is possible to obtain the following effects.

(i) The present invention can be constructed by only one LAN physically in view of the protocol.

(ii) The real-time response does not depend on the token retaining time but depends on the maximum frame length, therefore, the present invention is superior in the real-time response.

(iii) By reducing the maximum frame length, it is possible to improve the real-time response without reducing the communication efficiency of large-scale data.

[B] SECOND EMBODIMENT

Next, description will be given with respect to the second embodiment of the present invention by referring to FIGS. 5 and 6.

Figure 5:
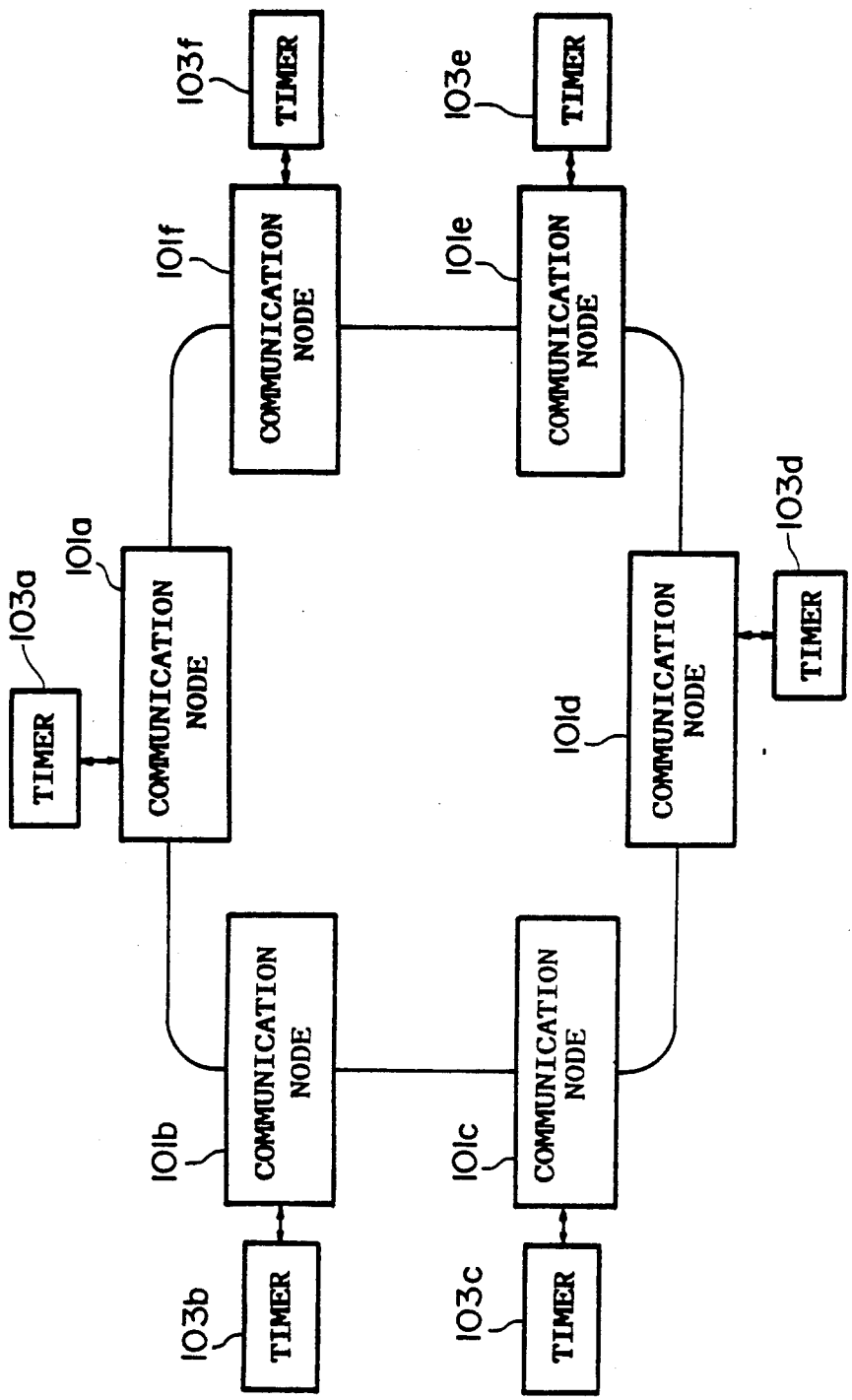
FIG. 5 is a block diagram showing a whole configuration of a second embodiment of the present invention.
Figure 6:
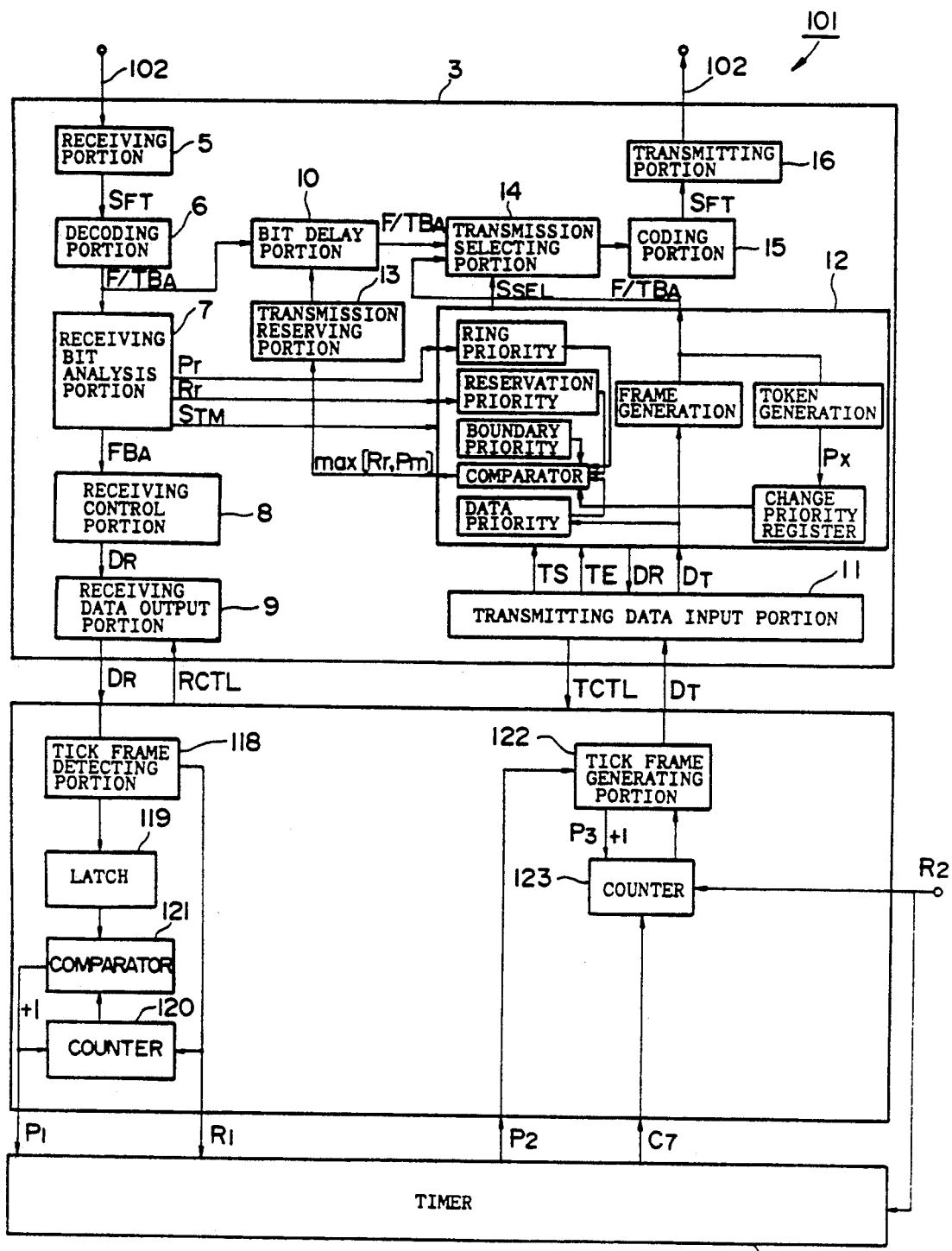
FIG. 6 is a block diagram showing a detailed configuration of each communication node shown in FIG. 5.

FIG. 5 shows the whole configuration of the ring-type LAN according to the second embodiment. In FIG. 5, 101a to 101f designate communication nodes, and 102 designates a transmission path. In addition, 103a to 103f designate timers each coupled to each of the communication nodes 101a to 101f.

Incidentally, the timer 103a generates the fundamental clock, while other timers 103b to 103f generate clocks in synchronism with the fundamental clock under operation of the tick MAC frame, which will be described later.

In the second embodiment, the communication nodes 101a to 101f are grouped into one or more node groups each including plural communication nodes all of which request the same fundamental clock and thereby have the same address. For example, the communication nodes 101c to 101e are contained in one node group to which one address is assigned. In this case, the communication node 101a produces the frame from the data concerning the clock, and this frame is transferred to such node group.

At this time, the communication node 101a applies the sequence number of the clock to the frame. Every time the frame is transferred to the communication nodes 101c to 101e, its sequence number is incremented. Meanwhile, the count values of the timers 103c to 103e coupled to the communication nodes 101c to 101e are all delayed behind the count value of the timer 103a coupled to the communication node 101a. Hence, a certain expected value is set for the above-mentioned sequence number.

For example, when the expected value of the sequence number is set at "3", i.e., when the sequence number "3" is detected from the transferred frame, the communication nodes 101c to 101e judge that the normal clock is transferred thereto.

In the case where although the expected value is "3", the sequence number detected from the transferred frame is "4", the communication nodes 1c to 1e judge that one data has been missed. In this case, therefore, they can perform the error correction for the clock.

Further, in the case where only the communication node 1c misses the data within the same node group, it can perform the error correction for the clock independently.

Under the above-mentioned operation, it is possible to easily perform the error correction for the clock to be commonly used with high efficiency.

Next, the following description indicates the frame format of the tick MAC frame which is used to perform the synchronization of the timers, while this tick MAC frame belongs to the MAC (i.e., media access control) frame which is used to manage the ring-type LAN. Herein, the term "tick" means the timing by which the timer clocks of the communication nodes are synchronized with each other.

"SD AC FC DA SA INFO FCS ED FS"

In the above-mentioned frame format, SD indicates the starting delimiter (1 octet); AC indicates the access control (1 octet) which contains the information concerning the priority and reservation from another communication node and another information used for the distinction between the token and frame; and FC indicates the frame control (1 octet) having the information concerning the frame type. Incidentally, the frame control (FC) of this tick MAC frame is set at "OOH". As similar to the foregoing first embodiment, DA, SA indicate the destination address and sending address (2 octet); INFO indicates the information by which the data portion (e.g., 0 to 136 octet) can be transmitted; FCS indicates the frame check sequence (2 octet); ED indicates the ending delimiter (1 octet); and FS indicates the frame status (1 octet).

Next, a detailed description will be given with respect to the destination address (DA) and information (INFO) which are particularly important for the second embodiment within the above-mentioned frame format.

(a) Destination Address (DA)

G F A A A A A A A A A A A A A A

Herein, address for each communication node is designated when G="0"; group address is designated when G="1" and F="0"; function address is designated when G="1" and F="1". This function address is assigned to the network management functions and additional function. When the function address is used as the destination address, the data is transferred to the designated function portion within a certain communication node.

In case of the above-mentioned tick MAC frame, the following function addresses are to be assigned, wherein maximum eight fundamental clocks can be defined.

| (Function) | (Function Address) | (DA) |
|---|---|---|
| tick 1 | 001H | C001H |
| tick 2 | 002H | C002H |
| tick 3 | 004H | C004H |
| tick 4 | 008H | C008H |
| tick 5 | 010H | C010H |
| tick 6 | 020H | C020H |
| tick 7 | 040H | C040H |
| tick 8 | 080H | C080H |

(b) Information (INFO)

The information field of the MAC frame includes the information concerning the instruction, response and the like (hereinafter, simply referred to as "vector") to be transferred for the management of the media access, which format is described as follows:

VL VI SVL SVI SVV ... SVL SVI SVV (i) VL is 16-bit binary, indicating the number of octets of the vector, i.e., vector length.

0004H ≦ VL ≦ FFFFH (ii) VI is 2-octet vector ID, which is divided into three fields.

d d d d s s s s c c c c c c c c

Herein, "dddd" is a destination class, including the identifier which indicates a certain function portion within the communication node corresponding to the frame destination, while "ssss" is a sending class, including the function identifier of the sending-side communication node. Incidentally, the vector ID(VI) of the tick MAC frame is at "8860H".

(iii) SVL is a sub-vector length, wherein sub-vector is used to add the further detailed information to the vector. However, in some cases, such sub-vector is not required. In addition, the sub-vector length is indicated by an 8-bit binary representative of the length corresponding to the number of octet included therein. Herein, this length contains SVL.

(iv) SVI is a sub-vector ID of one octet. Incidentally, the sub-vector ID (i.e., SVI) of the tick MAC frame is at "65H".

(v) SVV is a sub-vector value, i.e., sub-vector parameter. In some cases, the sub-vector ID is provided, however, sometimes no sub-vector value is provided. The length and format are determined by the sub-vector ID. Incidentally, the sub-vector value (i.e., SVV) of the tick MAC frame is represented by "reset, sequence". Herein, "reset" is the data consisting of one bit which is used to reset the timer synchronizing with the fundamental clock, while "sequence" is the data consisting of seven bits which is used to correct the clock shift due to the communication error.

(1) Configuration

Next, a detailed description will be given with respect to the communication node according to the second embodiment by referring to FIG. 6, wherein parts identical to those of the foregoing first embodiment will be designated by the same numerals, hence, description thereof will be omitted. As comparing to the first embodiment shown in FIG. 2, the second embodiment is characterized by the configuration and operation of a data processing portion 105 which is coupled between the LAN connecting portion 4 and timer 103.

In the data processing portion 105, 118 designates a tick frame detecting portion which detects the tick MAC frame from the receiving data $D_R$ to thereby output the sequence number or a reset pulse $R_1$; 119 designates a latch which retains the sequence number; and 120 designates a free-run counter. In addition, 121 designates a comparator which compares the output value of the latch 119 to the count value of counter 120. When these values are different from each other, the comparator 121 outputs a pulse $P_1$ by which the count value is incremented by "1". Incidentally, the reset pulse $R_1$ resets the counter 120.

Further, 122 designates a tick frame generating portion which inputs a pulse $P_2$ outputted from the timer 103 to thereby generate the tick MAC frame having the sequence number represented by the data consisting of the predetermined function address, data "reset"="0" and lower seven bits (i.e., rightmost seven bits) of the current count value of the timer 103. In addition, this portion 122 outputs a pulse $P_3$ to thereby increment the count value of a free-run counter 123, i.e., to increase the sequence number by ""1". When a counter 123 is cleared by a reset pulse $R_2$ inputted thereto from the upper-stream portion, the tick frame generating portion 122 simultaneously generates an initializing frame.

Incidentally, it is assumed that the communication nodes 101c to 101e are set at "tick 1", i.e., "001H".

(2) Operation

In the second embodiment, of course, the LAN connecting portion 3 operates as described before in the first embodiment, hence, description thereof will be omitted.

When the timer 103a supplies the pulse $P_2$ to the communication node 101a, the tick frame generating portion 122 generates the tick MAC frame having the sequence number consisting of the data represented by the function address at "001H", data "reset"="0" and lower seven bits of the current count value of the timer 103a, and it also outputs the pulse $P_3$ to thereby increment the count value of the free-run counter 123, i.e., to increase the sequence number "1".

Thus, the communication node 101a obtains the token circulating through the transmission path 102, thereby obtaining the transmission right. Then, the transmission control portion 12 changes the obtained token to the frame start sequence, which is further added with the control field, address field, information field, frame check sequence and frame end sequence. Thereafter, such data is outputted as the tick MAC frame bit string $FB_A$ with the selecting signal $S_{SEL}$.

Then, the transmission selecting portion 14 selects the tick MAC frame bit string $FB_A$ outputted from the transmission control portion 12, which is coded by the coding portion 15 and then transmitted as the signal $S_{FT}$ via the transmitting portion 16.

Thus, this signal $S_{FT}$ is transmitted to the communication node 101b adjacent to the communication node 101a. In the communication node 101b, based on the transmitted signal $S_{FT}$ which is received by the receiving portion 5 and then decoded by the decoding portion 6, the receiving bit analysis portion 7 detects the timing signal $S_{TM}$, detects and produces the ring priority Pr and reservation priority Rr and outputs the tick MAC frame bit string $FB_A$.

Further, the receiving control portion 8 judges whether or not the tick MAC frame bit string $FB_A$ is addressed thereto. In this case, the judgement result is negative, therefore, the receiving data $D_T$ is not outputted.

Next, the bit delay portion 10 rewrites some bits of the tick MAC frame bit string $FB_A$ which is now relayed thereby. Now, description will given with respect to the case where the transmitting data $D_T$ to be transmitted to the communication node 101d having the data priority Pm="001" existed in the communication node 101b. In this case, the transmission reserving portion 13 inputs the priority data max[Rr,Pm] outputted from the transmission control portion 12, wherein "1" is set at the leftmost bit within three bits of such priority data. This value "1" is set to the reservation index bit $R_1$ of the frame/token bit string $F/TB_A$ which is now passing through the bit delay portion 10.

In this case, the communication node 101b does not intend to output the data therefrom. Therefore, its transmission selecting portion 14 selects the tick MAC frame bit string $FB_A$ outputted from the bit delay portion 10. After being coded by the coding portion 15, it is transmitted as the signal $S_{FT}$ via the transmitting portion 16.

Thus, this signal $S_{FT}$ is transferred to the communication node 101c adjacent to the communication node 101b. In the communication node 101c, the transmitted signal $S_{FT}$ is received by the receiving portion 5 and decoded by the decoding portion 6. Thereafter, the receiving bit analysis portion 7 detects the timing signal $S_{TM}$, detects and produces the ring priority Pr and reservation priority Rr and outputs the tick MAC frame bit string $FB_A$.

Further, the receiving control portion 8 judges whether or not the tick MAC frame bit string $FB_A$ is addressed thereto. In this case, the function address is at "001H". Therefore, the receiving control portion 8 outputs the receiving data $D_R$ to the receiving data output portion 9, which also outputs the receiving data $D_R$ to the data processing portion 105 based on the receiving control signal RCTL.

Thus, in the data processing portion 105 of the communication node 101c, the tick frame detecting portion 18 detects the tick MAC frame from the receiving data $D_R$ to thereby output the corresponding sequence number. This sequence number is retained by the latch 119, and then compared to the count value of the counter 120 in the comparator 121. In this case, the comparator 121 does not output the pulse $P_1$ when these values are equal to each other. However, when these values are different from each other, the comparator 121 outputs the pulse $P_1$ to thereby increment the count value of counter 120 by "1". This increment is repeatedly performed until the sequence number retained in the latch 119 coincides with the count value of the counter 120. In the second embodiment, such incrementing is performed on the count value within the range between "1" and "127", because the sequence number is represented by the data of seven bits. Incidentally, the expected value of each communication node is normally larger than the sequence value of the fundamental clock. In other words, each communication node does not receive the data which quantity is larger than that of the transmitting data. Therefore, the above increment range must be larger than zero.

For example, description will be given with respect to an example in which the sequence number "3" is detected from the transferred tick MAC frame when the expected value "3" is currently given in regard to the sequence number in the data processing portion 105 of the communication node 101c, i.e., when the counter 120 outputs the count value "3". In this case, it is assumed that the normal data transfer is performed, therefore, the comparator 121 does not output the pulse $P_1$. In contrast, when the sequence number "4" is detected from the transferred tick MAC frame, regardless of the count value "3" of the counter 120, it is assumed that one data has been missed during the transmission. In this case, the comparator 121 outputs one pulse $P_1$ corresponding to one missed data.

Thus, the timer 103c coupled to the communication node 101c divides the frequency of the pulse $P_1$ to thereby perform the error correction on the internal clock thereof.

In some cases, the receiving node sends a ring error monitor (REM) frame to the sending node to thereby inform the sending node of the the error.

As similar to the above-mentioned communication node 101c, the other communication nodes 101d, 101e also perform the detection of the tick MAC frame and clock error correction.

When the upper-stream portion supplies the reset pulse $R_2$ to the data processing portion 105 and timer 103a of the communication node 101a, the counter 123 and timer 103a are cleared. At the same time, the tick frame generating portion 122 generates the tick MAC frame, i.e., initializing frame consisting of the data representing the function address, "reset"="1" and sequence number "0000000".

Thus, the communication node 101a obtains the token circulating through the transmission path 102 to thereby obtain the transmission right. As described before, after being coded by the coding portion 15, the signal $S_{FT}$ is transmitted via the transmitting portion 16.

Thereafter, the signal $S_{FT}$ is transferred to the communication node 101c via the communication node 101b. In the communication node 101c, the signal $S_{FT}$ is received by the receiving portion 5 and decoded by the decoding portion 6. Then, the receiving bit analysis portion 7 detects the timing signal $S_{TM}$, detects and produces the ring priority Pr and reservation priority Rr and outputs the tick MAC frame bit string $FB_A$.

Further, the receiving control portion 8 judges whether or not the tick MAC frame bit string $FB_A$ is addressed thereto. In this case, the function address is at "001H". Therefore, it outputs the receiving data $D_R$. Next, the receiving data output portion 9 outputs the receiving data $D_R$ to the data processing portion 105 based on the receiving control signal RCTL.

Thus, the thick frame detecting portion 118 detects the tick MAC frame, i.e., initializing frame from the receiving data $D_R$ to thereby output the reset pulse $R_1$. This reset pulse $R_1$ clears the contents of the counter 120 and timer 103c.

Similarly, the other communication nodes 101d, 101e also perform the detection of the tick MAC frame and clearing operation of the counter 120 and timer 103.

As described heretofore, when the transfer error is occurred during the transfer of the tick MAC frame concerning the fundamental clock, the second embodiment is designed such that the receiving node outputs the pulse corresponding to the transfer error. Therefore, it is possible to directly connect the general-use programmable timer to each communication node. In addition, it is possible to build the timer into the communication node.

Therefore, in the case where the application software is executed in the external device coupled to the communication node, the transfer operation can be automatically performed on the tick MAC frame by merely setting some data, such as the interval of fundamental clock, concerning the timer in the application software.

In the communication node which receives the tick MAC frame, the clock error correction can be performed with high efficiency by merely dividing the frequency of the pulse $P_1$ outputted from the data processing portion 105 in the timer 103.

Thus, it is possible to neglect the operation of LAN which affects the operation of each communication node. Therefore, each communication node can operate without being affected by the distinction between the external clock and internal clock so that all communication nodes can operate as if only one timer is shared among them.

In the second embodiment, the timer 103 is constructed by the hardware. However, it is possible to embody the operation of the timer by use of the software process. In this case, some parameters must be set so that the software process will function as similar to the timer 103.

According to the second embodiment as described heretofore, it is possible to easily perform the clock error correction with high efficiency.

[C] THIRD EMBODIMENT

Figure 7:
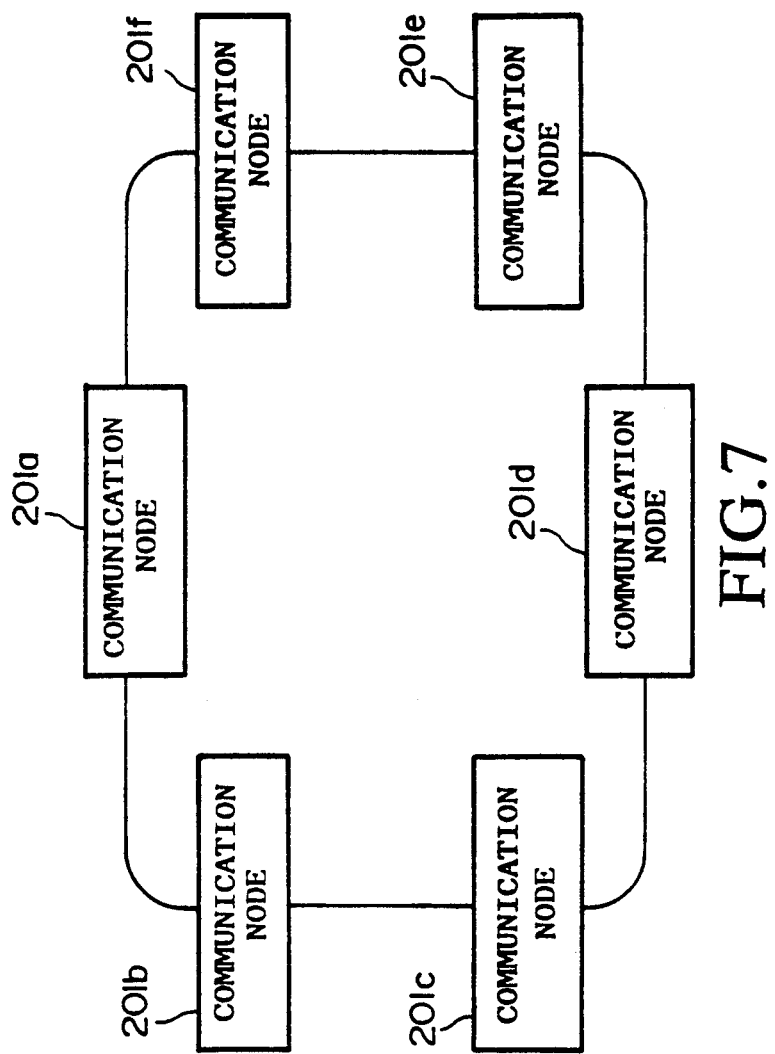
FIG. 7 is a block diagram showing a whole configuration of a third embodiment of the present invention.

Next, description will be given with respect to the third embodiment of the present invention by referring to FIGS. 7 and 8. FIG. 7 shows the whole configuration of the ring-type LAN according to the third embodiment, wherein communication nodes 201a to 201f are linked together by a transmission path 202.

Herein, the format of the MAC frame is as follows:

SD AC FC DA SA INFO FCS ED FS, which is very similar to the foregoing frame format of the first embodiment. Within this format, the frame status (FS) is configured as follows:

ACrrACrr

Herein, A indicates an address recognition bit; C indicates a frame copy bit; and r indicates an un-used bit. Bits A and C are both transferred from the frame-sending communication node at "0" level. When a certain communication node has the address coinciding with the destination address, it set "1" at bit A. When the frame is copied, "1" is set at bit C.

In order to recognize all of the addresses of the communication nodes which are linked together, it is sufficient for each communication node to at least recognize the address of its upper-stream and adjacent communication node (hereinafter, simply referred to as "upper-adjacent node address"). Therefore, the communication node which wants to recognize the ring configuration of the LAN makes an inquiry about the upper-adjacent node address, which inquiry operation is made with respect to all of other communication nodes in turn. Incidentally, this inquiry operation is made by use of the upper-stream frame.

Thus, one of the communication nodes on the network has a function, called "active monitor", by which the abnormal token or frame circulating through the ring once or more is detected and then removed so that a new token is to be produced. This communication node performs the following process periodically.

Herein, the active monitor (which function is assigned to the communication node 201a, for example) is called "AMP-MAC frame". In the frame indicating that the active monitor operates normally, "0" is set at both of bits A and C within its frame status (FS) and the sending address (SA) is set identical to the address of the present communication node. Incidentally, the communication node other than the communication node having the active monitor function is simply called as "standby monitor".

Next, when the first lower-stream communication node 201b (i.e., one of the standby monitors) receives the AMP-MAC frame, it recognizes the sending address (SA, indicating the active monitor 201a) as the upper-adjacent node address.

This communication node 201b sets "1" at bits A and C of the frame status (FS) of the AMP-MAC frame, which is then transferred therefrom. After the predetermined time has passed, the communication node 201b transfers a SMP-MAC frame indicating that the standby monitor operates normally, wherein the sending address (SA) is set identical to the address thereof.

Since "1" is set at bit A of the frame status (FS) of the AMP-MAC frame, the next lower-stream communication node 201c does not recognize the sending address (SA) of the AMP-MAC frame as the upper-adjacent node address thereof. By receiving the SMP-MAC frame in which "0" is set at bit A of the frame status (FS), the communication node 201c recognizes the sending address (SA) as the upper-adjacent node address thereof.

Then, the communication node 201c copies and transfers the above-mentioned SMP-MAC frame. After the predetermined time, the communication node 201c transfers the SMP-MAC frame of which sending address (SA) indicates the address thereof.

When the above-mentioned process is performed on the communication nodes on the ring once, all communication nodes can recognize the upper-adjacent node addresses respectively. Incidentally, the above-mentioned process may be clearly understood by referring to U.S. Pat. No. 4,507,777.

In the above-mentioned token-ring-type LAN, each communication node must transfer the AMP-MAC frame or SMP-MAC frame onto the ring by every predetermined time. Particularly, the number of the SMP-MAC frames to be transferred on the ring is equal to the number which is obtained by subtracting one from the total number of the communication nodes provided on the ring-type LAN.

For this reason, there is a drawback in the data transfer cannot be made during the period in which the above-mentioned frame is transferred on the ring, which restricts the capacity of the transmission path.

In order to solve the above-mentioned drawback, the period for recognizing the upper-adjacent node address must be shortened so that the transmission path can be used efficiently. Based on this concept, each communication node 201 is configured as shown in FIG. 8 in the third embodiment.

Before describing the detailed configuration of the communication node according to the third embodiment, description will be given with respect to the basic feature of the third embodiment.

First, description will be given with respect to the information (INFO) field within the AMP-MAC frame in detail. This information (INFO) field of the MAC frame contains the information concerning the instruction, response and the like (i.e., vector) which is transferred in order to manage the media access control (MAC). This information field is configured according to the following format:

VL VI SVL SVI SVV ... SVL SVI SVV,

, which is very similar to the format of the information field of the foregoing second embodiment.

(i) VL is the 16-bit binary, indicating the vector length, where $00004H \leq VL \leq FFFFH$.

(ii) VI is the vector ID, which is divided into three fields as follows:

d d d d s s s s c c c c c c c c,

, where "dddd" indicates the destination class, "ssss" indicates the sending class and "cccccccc" corresponds to the vector cord indicating the function. Incidentally, the vector ID (i.e., VI) of the AMP-MAC frame is at "00005H".

(iii) SVL is the sub-vector length.

(iv) SVI is the sub-vector ID of one octet. Incidentally, the sub-vector ID (i.e., SVI) of the AMP-MAC frame is at "03H", indicating that the sub-vector value (i.e., SVV) corresponds to the upper-adjacent node address.

(v) SVV is the sub-vector value, i.e., sub-vector parameter. Incidentally, the sub-vector value (i.e., SVV) of the AMP-MAC frame is added with the upper-adjacent node address of two octet.

By every predetermined time, the active monitor transfers the sub-vector value (i.e., SVV) of the AMP-MAC frame which is accompanied with the address of the current communication node.

Next, when the first standby monitor, provided in the lower-stream, receives the AMP-MAC frame, it inputs the accompanied address as the upper-adjacent node address therein. In addition, when copying the AMP-MAC frame, such standby monitor replaces the sub-vector value (SVV) by the address thereof and then transfers the AMP-MAC frame.

When the next standby monitor provided in the lower-stream receives the AMP-MAC frame, it inputs the address accompanied with the sub-vector value (SVV) of the AMP-MAC frame as the upper-adjacent node address. In addition, when copying the AMP-MAC frame, such standby monitor replaces the sub-vector value (SVV) by the address thereof and then transfers the AMP-MAC frame.

Thereafter, the active monitor recovers the AMP-MAC frame which is circulated through the ring once, of which the upper-adjacent node address is inputted therein.

When the above-mentioned process is performed by all communication nodes linked together on the ring, all communication nodes can recognize the respective upper-adjacent node address. Thus, it is not necessary to transfer the AMP-MAC frames, which number is equal to the number obtained by subtracting one from the total number of communication nodes. Therefore, it is possible to reduce the used portion of the transmission path.

(1) Configuration

Next, description will be given with respect to the communication node according to the third embodiment by referring to FIG. 8, wherein parts indentical to those of the first embodiment shown in FIG. 2 will be designated by the same numerals, hence, description thereof will be omitted.

Figure 8:
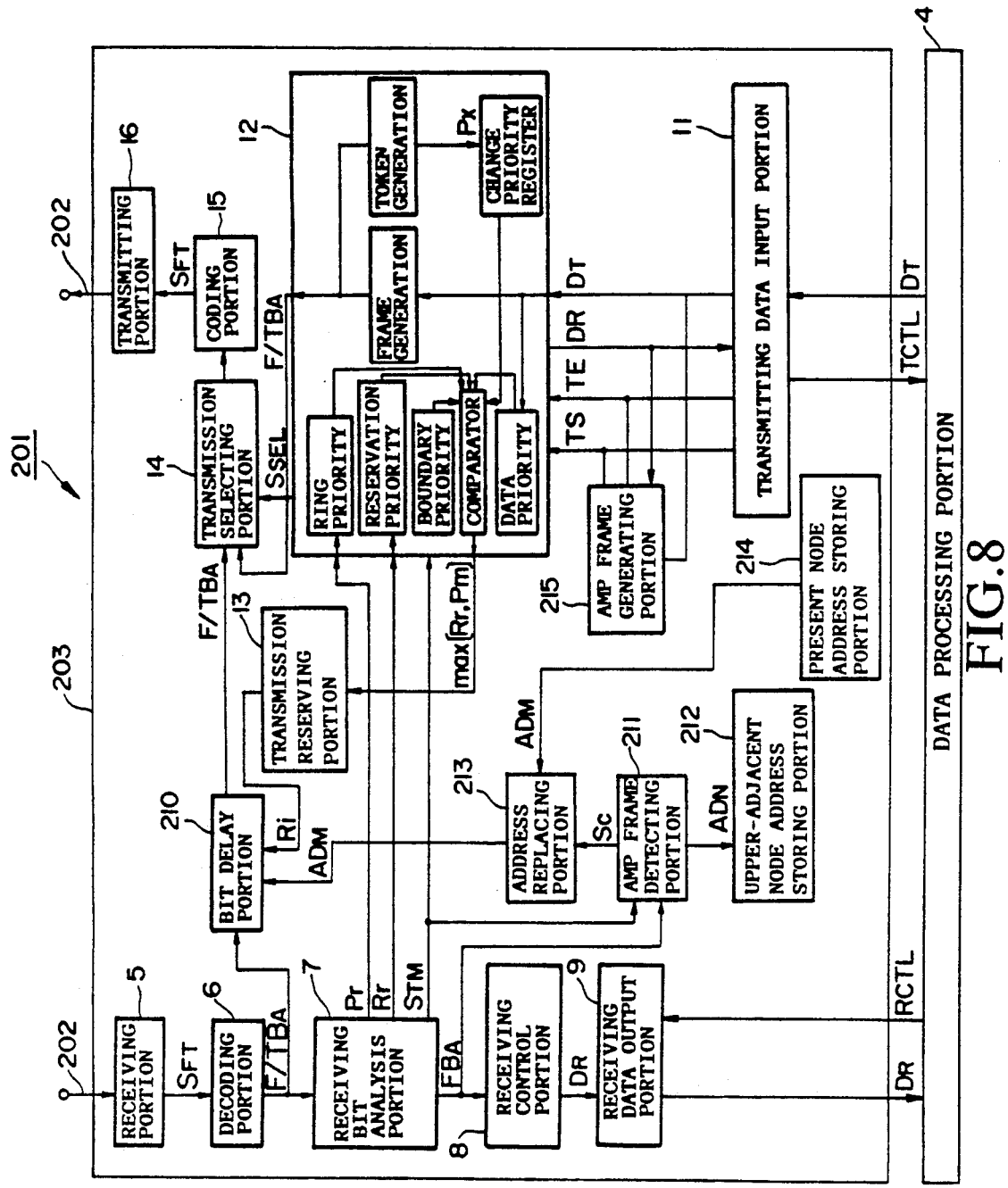
FIG. 8 is a block diagram showing a detailed configuration of each communication node shown in FIG. 7.

In the communication node 201 shown in FIG. 8, 203 designates a LAN connecting portion coupled between the transmission path 202 and data processing portion 4. As comparing to the first embodiment, the third embodiment is characterized by providing elements 210 to 215, wherein 210 designates a bit delay portion; 211 designates an AMP frame detecting portion; 212 designates an upper-adjacent node address storing portion; 213 designates an address replacing portion; 214 designates a present node address storing portion; and 215 designates an AMP frame generating portion.

Herein, the AMP frame detecting portion 211 inputs the frame bit string $FB_A$ and timing signal $S_{TM}$ outputted from the receiving bit analysis portion 7, thereby detecting the AMP-MAC frame from the frame bit string $FB_A$. Then, the AMP frame detecting portion 211 stores an upper-adjacent node address $AD_N$ in the upper-adjacent node address storing portion 212, wherein this upper-adjacent node address $AD_N$ is accompanied with the sub-vector value (SVV) of the detected AMP-MAC frame. In addition, the AMP frame detecting portion 211 supplies a control signal $S_C$ to the address replacing portion 213, by which the address replacing portion 213 is designated to replace the sub-vector value (SVV) of the frame bit string $FB_A$.

Under control of the control signal $S_C$, the address replacing portion 213 replaces the sub-vector value (SVV) of the frame bit string $FB_A$ which is now passing through the bit delay portion 210 by a present node address $AD_M$ stored in the present node address storing portion 214.

Incidentally, the AMP frame generating portion 215 generates the AMP-MAC frame by every predetermined time to thereby output the transmitting data $D_T$. Herein, the transmission control portion 12 shown in FIG. 8 is configured as similar to that shown in FIG. 2. In FIG. 8, based on the transmission designating signal TS and transmission end signal TE which are supplied from both of the transmitting data input portion 11 and AMP frame generating portion 215, the transmission control portion 12 outputs the data request signal DR to the transmitting data input portion 11 and AMP frame generating portion 215 to thereby input the transmitting data $D_T$, the transmission control portion 12 generates the frame bit string $FB_A$ which is outputted therefrom in accordance with the protocol of the token ring. Generation of this frame bit string $FB_A$ is made based on the data priority Pm extracted from the transmitting data $D_T$ and the ring priority Pr, reservation priority Rr and timing signal $S_{TM}$ outputted from the receiving bit analysis portion 7.

(2) Operation

In the third embodiment, the communication node 201a is set as the active monitor, while other communication nodes 201b to 201f are set as the standby monitors as described before. Each of the communication nodes 201a to 201f stores the predetermined address $AD_M$ in the present node address storing portion 214 in advance. Herein, the present node addresses $AD_M$ of the communication nodes 201a to 201f are respectively set at "0005H", "0010H", "0007H", "0018H", "0004H" and "0003H".

In the active monitor 201a, the AMP frame generating portion 215 generates and outputs the transmission designating signal TS and AMP-MAC frame by every predetermined time, wherein the AMP-MAC frame is accompanied with the present node address $AD_M$, i.e., "0005H", at its sub-vector value (SVV).

Thus, based on the transmission designating signal TS outputted from the AMP frame generating portion 215, the transmission control portion 12 of the active monitor 201a outputs the data request signal DR to the AMP frame generating portion 215 to thereby input the transmitting data $D_T$, so that it obtains the token circulating through the transmission path 202.

The obtained token is changed to the frame start sequence, which is further added with the control field, address field, information field, frame check sequence and frame end sequence. Then, it is outputted as the frame bit string $FB_A$ with the selecting signal $S_{SEL}$.

Next, the frame bit string $FB_A$ outputted from the transmission control portion 12 is selected by the transmission selecting portion 14. After being coded by the coding portion 15, it is outputted as the signal $S_{FT}$ via the transmitting portion 16.

Thus, the signal $S_{FT}$ is transferred from the active monitor 201a to the standby monitor 201b provided in the lower-stream. In the standby monitor 201b, the transferred signal $S_{FT}$ is received by the receiving portion 5 and decoded by the decoding portion 6. Then, the receiving bit analysis portion 7 detects the timing signal $S_{TM}$, detects and produces the ring priority Pr and reservation priority Rr and also outputs the frame bit string $FB_A$.

Next, by use of the frame bit string $FB_A$ and timing signal $S_{TM}$ outputted from the receiving bit analysis portion 7, the AMP frame detecting portion 211 of the standby monitor 201b detects the AMP-MAC frame from the frame bit string $FB_A$. Thereafter, the upper-adjacent node address $AD_N$, i.e., "0005H", accompanied with the sub-vector value (SVV) of the AMP-MAC frame is stored in the upper-adjacent node address storing portion 212. In addition, by outputting the control signal $S_C$ to the address replacing portion 213, the AMP frame detecting portion 211 designates to replace the sub-vector value (SVV) of the frame bit string $FB_A$.

Thus, under control of the control signal $S_C$, the address replacing portion 213 replaces the sub-vector value (SVV) of the frame bit string $FB_A$ by the present node address $AD_N$, i.e., stored in the present node address storing portion 214, wherein the frame bit string $FB_A$ is now passing through the bit delay portion 210.

Thereafter, the frame bit string $FB_A$ outputted from the bit delay portion 210 is selected by the transmission selecting portion 14 and coded by the coding portion 15. Then, it is transmitted as the signal $S_{FT}$ via the transmitting portion 16.

Thus, the signal $S_{FT}$ is transferred from the standby monitor 201b to the next standby monitor 201c in the lower-stream.

As similar to the above-mentioned standby monitor 201b, the signal $S_{FT}$ is transferred through the other standby monitors 201c to 201f.

At last, the active monitor 201a recovers the AMP-MAC frame which is circulated through the ring once, thereby inputting the upper-adjacent node address $AD_N$ therein. Thus, all of the communication nodes 201a to 201f can recognize the respective upper-adjacent node addresses $AD_N$.

[D] FOURTH EMBODIMENT

Figure 9:
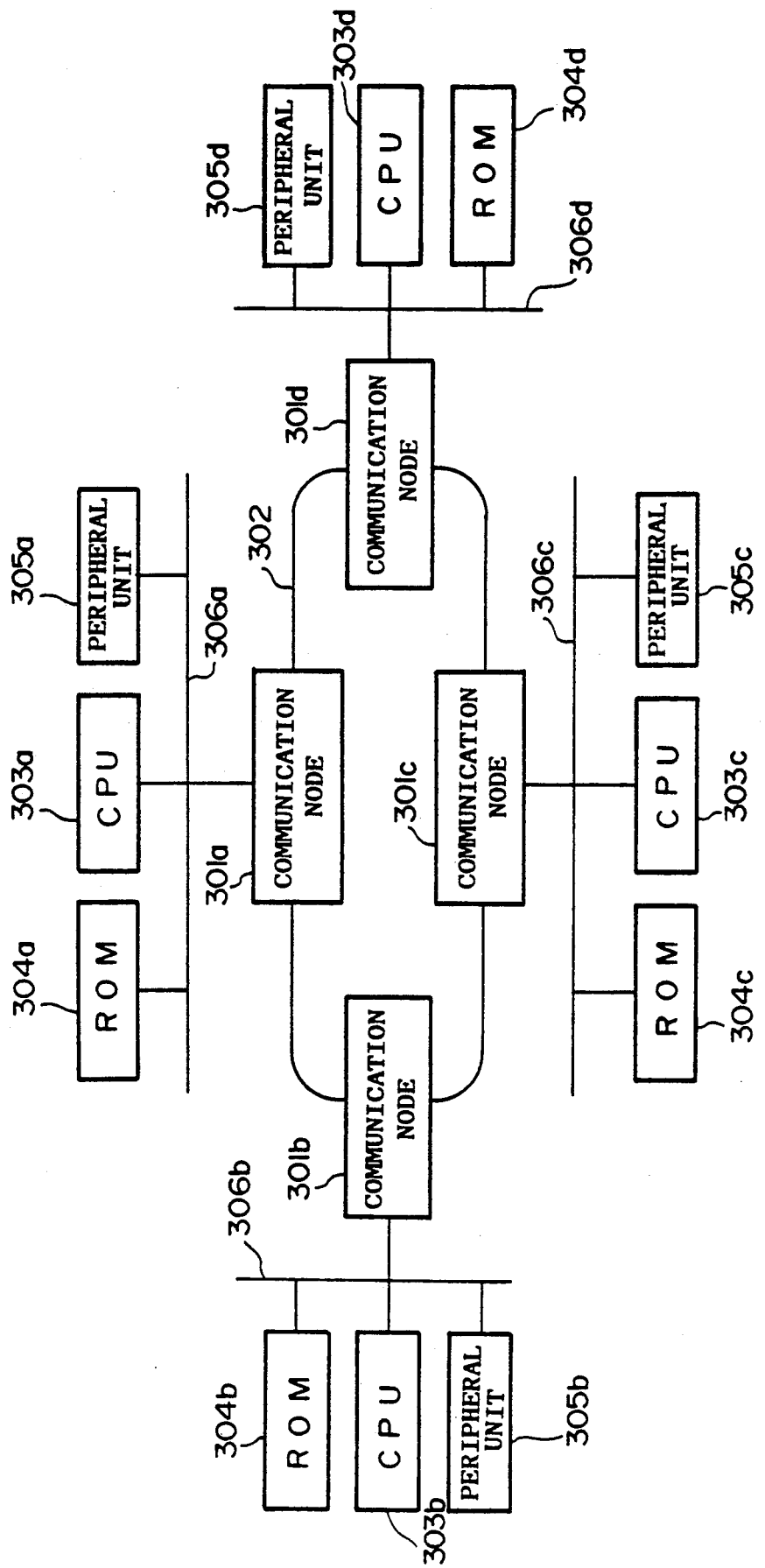
FIGS. 9 and 10 are block diagrams each showing an example of a whole configuration of a fourth embodiment of the present invention.

Next, description will be given with respect to the fourth embodiment of the present invention by referring to FIGS. 9 to 11. FIG. 9 shows the whole configuration of the ring-type LAN according to the fourth embodiment of the present invention, wherein 301a to 301d designate communication nodes each performing a mutual data communication; 302 designates a transmission path; 303a to 303d designate central processing units (CPUs) for controlling the communication nodes 301a to 301d respectively; 304a to 304d designate read-only memories (ROMs) for storing software programs used in the CPUs 303a to 303d respectively; 305a to 305d designate peripheral units each configured by the key pad, panel display and the like; and 306a to 306d designate buses.

In order to transfer the data inputted/outputted via each communication node to each peripheral unit, each CPU performs the data transfer by use of the software program stored in each ROM.

However, the above-mentioned configuration of the ring-type LAN has a drawback in that each peripheral unit must be heavy duty because of the existence of the CPU. Therefore, even when a small amount of data is merely inputted or outputted, e.g., even when the present LAN uses the peripheral unit to be merely connected to the I/O port thereof, it is necessary to provide the software program for each peripheral unit.

Figure 10:
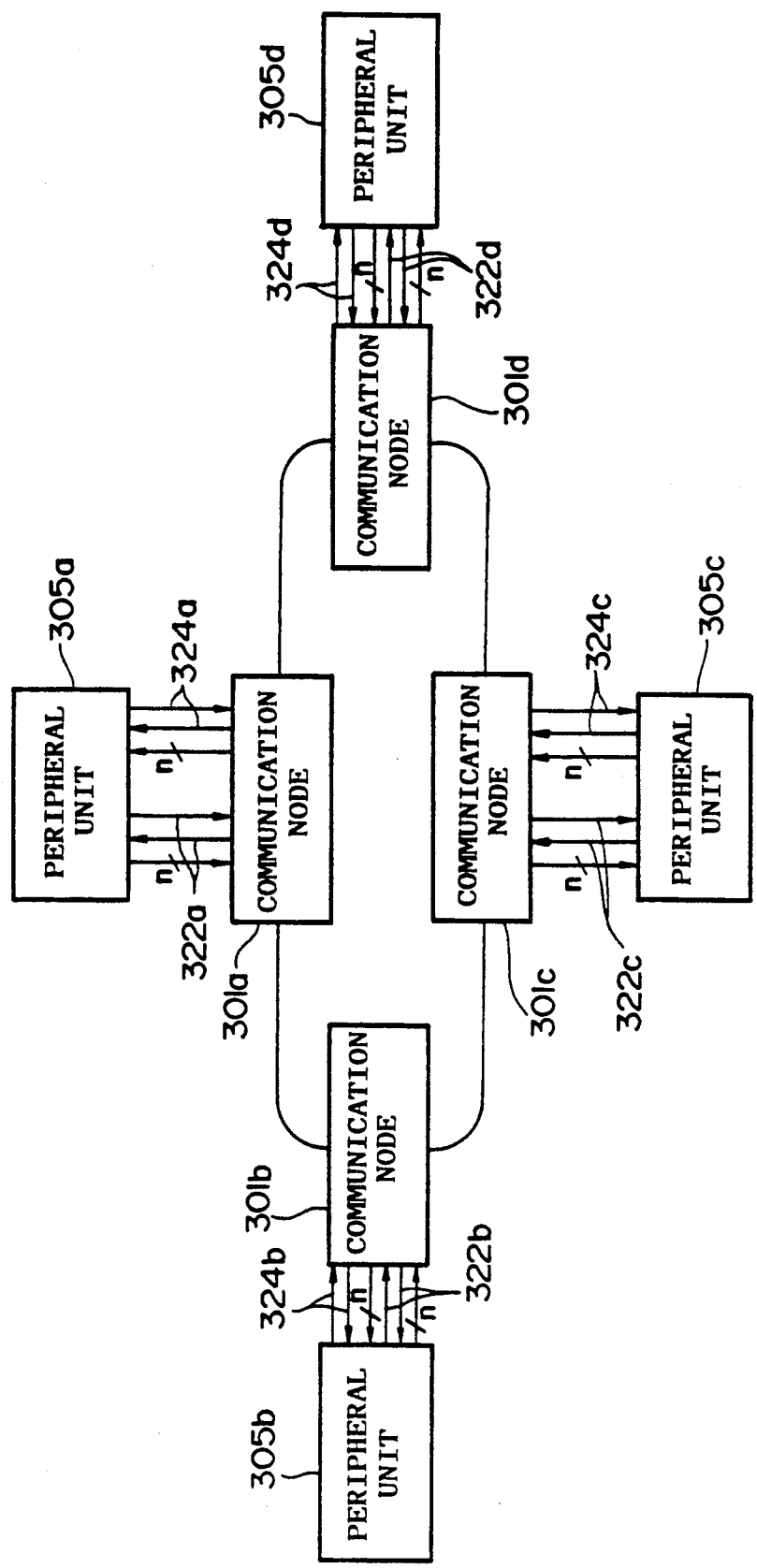
Figure 11:
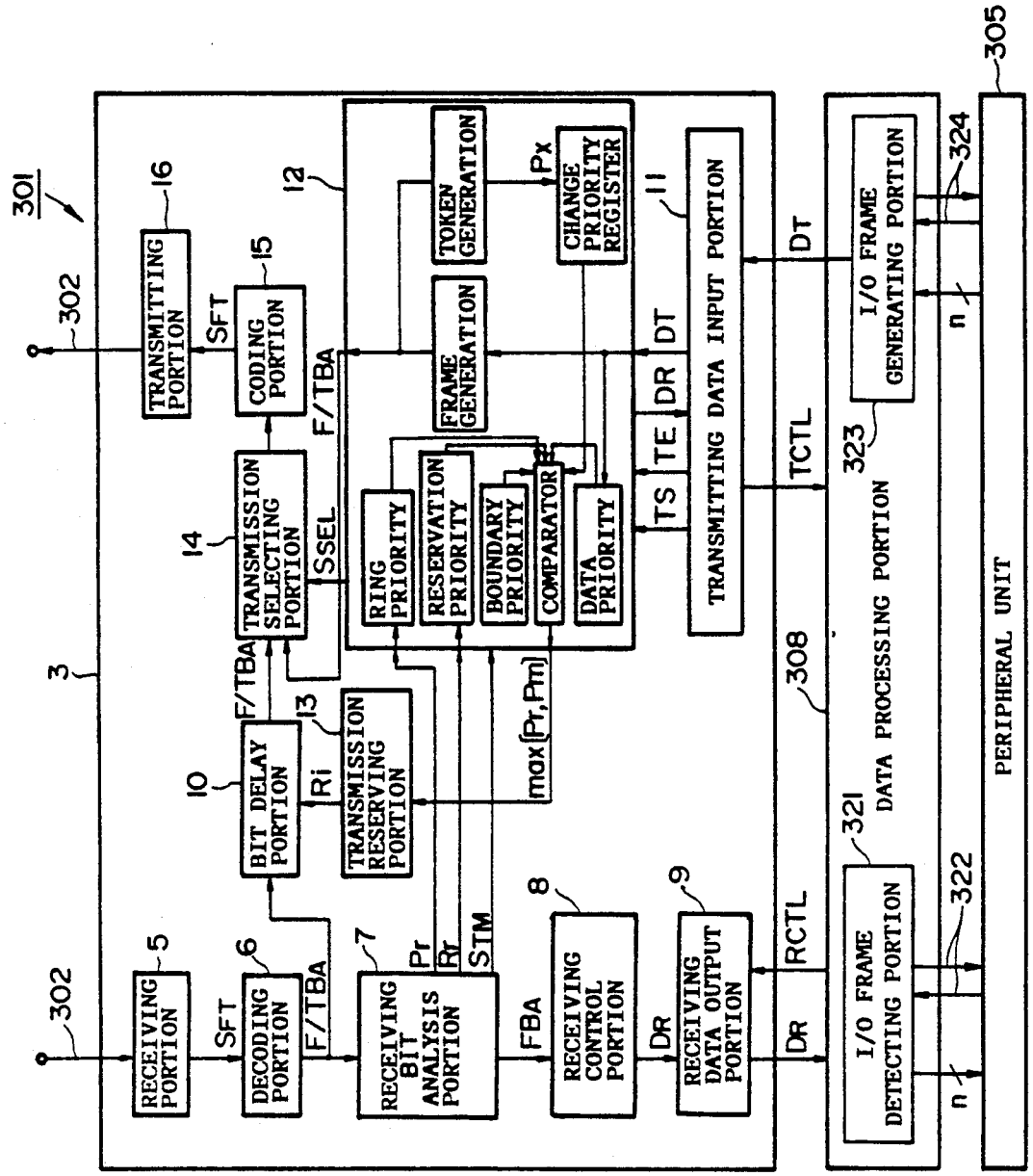
FIG. 11 is a block diagram showing a detailed configuration of each communication node shown in FIGS. 9 and 10.

In order to solve the above-mentioned drawback, the ring-type LAN as shown in FIG. 9 can be modified as shown in FIG. 10, in which each communication node is designed as shown in FIG. 11 so that each peripheral unit can reduce its load.

In FIG. 11, each communication node 301 is configured by the LAN connecting portion 3 and a data processing portion 308 coupled to the peripheral unit 305. Herein, the LAN connecting portion 3 is constructed as similar to that of the first embodiment shown in FIG. 2, hence, detailed description thereof will be omitted. As similar to the foregoing data processing portion 4 shown in FIG. 2, the data processing portion 308 shown in FIG. 11 processes the receiving data $D_R$ and transmitting data $D_T$ which are transmitted in accordance with the receiving control signal RCTL and transmission control signal TCTL respectively.

In the data processing portion 308, 321 designates an input/output (I/O) frame detecting portion which detects an input/output MAC frame from the receiving data $D_R$. Between the I/O frame detecting portion 321 and peripheral unit 305, there is provided a hand-shake line 322 which is connected to the data input/output terminal and control signal input/output terminal of the data processing portion 308. By use of this hand-shake line 322, it is possible to output n-bit data via the data input/output terminal while acknowledging the data transfer state by the control signal to be transmitted via the control signal input/output terminal. In addition, 323 designates an input/output (I/O) frame generating portion which is connected to the peripheral unit 305 via another hand-shake line 324 to be connected to other data input/output terminal and control signal input/output terminal of the data processing portion 308. By use of the hand-shake line 324, it is possible to input n-bit data via the data input/output terminal while acknowledging the data transfer state by the control signal to be transmitted via the control signal input/output terminal. Thus, the I/O frame generating portion 323 generates the input/output MAC frame.

In the fourth embodiment, each peripheral unit 305 has the interface which can be directly connected to the above-mentioned data input/output terminal and control signal input/output terminal.

Incidentally, each peripheral unit 305 is assigned to each communication node 301 in advance, so that the data communication is made between these peripheral unit and communication node. In other words, the destination address (DA) of the above-mentioned input/output MAC frame is accompanied with the address of designated one of the communication nodes in advance.

Next, description will be given with respect to the data transfer in which the data of the peripheral unit 305a coupled to the communication node 301a is transferred to the peripheral unit 305c coupled to the communication node 301c.

First, by use of the hand-shake line 324a provided for the communication node 301a, the peripheral unit 305a must acknowledge that the data processing portion 308 of the communication node 301a outputs the receiving OK signal (i.e., receiving ready signal). Thereafter, the peripheral unit 305a outputs the n-bit data to the data processing portion 308.

Thus, the I/O frame generating portion 323 receives the n-bit data to thereby generate the input/output MAC frame. Then, the data processing portion 308 outputs the transmitting data $D_T$.

Next, the transmitting data input portion 11 inputs the transmitting data $D_T$ and transmission control signal TCTL outputted from the data processing portion 308. Based on the transmission control signal TCTL, the transmitting data input portion 11 outputs the transmitting data $D_T$ and transmission designating signal TS.

Based on the transmission designating signal TS, the transmission control portion 12 of the communication node 301a outputs the data request signal DR to the transmitting data input portion 11 to thereby input the transmitting data $D_T$ therein. Then, based on the data priority Pm of this transmitting data $D_T$, the transmission control portion 12 obtains the token circulating through the transmission path 302.

Thereafter, the obtained token is changed to the frame start sequence, which is further added with the control field, address field, information field, frame check sequence and frame end sequence. Then, it is outputted as the frame bit string $FB_4$ with the selecting signal $S_{SEL}$.

Next, the frame bit string $FB_4$ outputted from the transmission control portion 12 is selected by the transmission selecting portion 14, coded by the coding portion 15 and then transmitted as the signal $S_{FT}$ via the transmitting portion 16.

Thus, the signal $S_{FT}$ is transferred to the communication node 301b adjacent to the communication node 301a. In the communication node 301b, several data processings are made on the transferred signal $S_{FT}$ as described before. However, the frame bit string $FB_4$ is not addressed to the communication node 301b, therefore, the receiving data $D_R$ is not outputted to the data processing portion.

Thereafter, the signal $S_{FT}$ is transferred to the communication node 301c adjacent to the communication node 301b. In this case, the frame bit string $FB_4$ is addressed to the communication node 301c, so that the receiving data output portion 9 inputs and then outputs the receiving data $D_R$ to the data processing portion 308 based on the receiving control signal RCTL.

Thus, the I/O frame detecting portion 321 of the communication node 301c inputs the receiving data $D_R$ to thereby detect the input/output MAC frame from the receiving data $D_R$. After acknowledging that the peripheral unit 305c outputs the receiving ready signal by use of the hand-shake line 322, the I/O frame detecting portion 321 outputs the n-bit data. As a result, the peripheral unit 305c receives the n-bit data transferred from the peripheral unit 305a.

Above is the description of the preferred embodiments of the present invention. Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A ring-type LAN employing a communication node managing method comprising:
   a plurality of communication nodes each having its specific address; and
   a transmission path for linking said plurality of communication nodes together into a ring,
   wherein said communication node managing method comprises steps of:
   setting a predetermined one of said plurality of communication nodes as a transmitting node which transmits a data accompanied with its specific address by every predetermined period;
   replacing the address of said data received in a lower-stream node provided in a lower-stream of said transmitting node by a specific address of said lower-stream node;
   transmitting said data from said lower-stream node;
   recovering said data circulating through said ring once by said transmitting node; and
   inputting the address of recovered data into said transmitting node, thereby managing said communication nodes.

2. In a token-ring-type LAN employing a priority setting method in which a plurality of communication nodes are linked together into a ring by a transmission path, said priority setting method comprising steps of:
   transferring a token or a frame onto said transmission path and circulating the token or frame through said communication nodes;
   setting a first priority representative of a current priority of said token or frame, a second priority which is used to make a reservation of a data transfer in response to a data priority of data existed in a current communication node and a third priority corresponding to a change of said first priority to be stored in the communication node which changes said first priority, each of said first, second and third priorities being represented by data of N bits (where N denotes an integral number) so that each priority has (N+1) stages of priority levels;
   assigning data of N bits concerning said first and second priorities into formats of said token and frame;
   judging a current priority level based on firstly set bit of said first and third priorities in view of their most significant bit;
   setting a bit corresponding to said data priority within N bits of said second priority of said token or frame to be transferred, thereby making a reservation of said data transfer;
   setting or resetting the same bit for said first priority of said token or frame to be transferred and said third priority stored in said current communication node, thereby changing said first priority; and
   recognizing that said current communication node changed said first priority when said first priority of said token recovered by said current communication node is identical to said third priority stored in said current communication node.

3. A token-ring-type local area network (LAN) comprising:
   a plurality of nodes each performing a data processing; and
   a transmission path for linking said plurality of nodes together in which a token used for obtaining a transmission right and a frame used for transmitting data to be transmitted from a node are circulated through, said token having a first memory area for memorizing a ring priority which is used for controlling a data transmission, while said frame having a second memory area for memorizing a reservation priority to be reserved by each node based on a data priority representing a priority of data owned by each node,
   wherein each of said node further comprises:
   frame generation means, when a current node receives a token through said transmission path from another node, for comparing a data priority of said current node with a ring priority of said received token, said frame generation means, when the comparison result thereof indicates that said data priority of said current node is higher than said ring priority of said received token, for generating and transmitting a frame having data to be transmitted from said current node without transmitting said received token;
   data dividing means, when a data priority of said current node is lower than a predetermined boundary priority level and when data to be transmitted from said current node has a size which is larger than a predetermined size, for dividing the data to be transmitted from said current node into a plurality of divided data each having a size equal to or smaller than the predetermined size, said divided data being sequentially transmitted with frames from said current node;

data transmission reserving means, when said current node receives a frame transmitted from another node, for comparing a data priority of said current node with a reservation priority of said received frame, said data transmission reserving means writing said data priority of said current node into a second memory area of said received frame when a comparison result thereof indicates that said data priority of said current node is higher than said reservation priority of said reserved frame; and token generating means, when said current node receives a frame transmitted by said current node while said current node is sequentially transmitting said divided data with said frames, for comparing a data priority of said current node with a reservation priority of said transmitted frame, said token generating means temporarily stopping transmitting a frame following said transmitted frame and generating a token having a ring priority corresponding to said reservation priority of said transmitted frame when a comparison result thereof indicates that said reservation priority of said transmitted frame is higher than said data priority of said current node.

4. A token-ring-type local area network (LAN) comprising:

a plurality of nodes each performing a data processing; and a transmission path for linking said plurality of nodes together in which a token used for obtaining a transmission right and a frame used for transmitting data to be transmitted from a node are circulated through, said token having a first memory area for memorizing a ring priority which is used for controlling a data transmission, while said frame having a second memory area for memorizing a reservation priority to be reserved by each node based on a data priority representing a priority of data owned by each node, wherein each of said nodes further comprises:

frame generation means, when a current node receives a token through said transmission path from another node, for comparing a data priority of said current node with a ring priority of said received token, said frame generation means, when the comparison result thereof indicates that said data priority of said current node is higher than said ring priority of said received token, for generating and transmitting a frame having data to be transmitted from said current node without transmitting said received token;

data dividing means, when a data priority of said current node is lower than a predetermined priority level and when data to be transmitted from said current node has a size which is larger than a predetermined size, for dividing the data to be transmitted from said current node into a plurality of divided data each having a size equal to or smaller than the predetermined size, said divided data being sequentially transmitted with frames from said current node;

data transmission reserving means, when said current node receives a frame transmitted from another node, for comparing a data priority of said current node with a reservation priority of said received frame, said data transmission reserving means writing said data priority of said current node into a second memory area of said received frame when a comparison result thereof indicates that said data priority of said current node is higher than said reservation priority of said reserved frame;

token generating means, when said current node receives a frame transmitted by said current node while said current node is sequentially transmitting said divided data with said frames, for comparing a data priority of said current node with a reservation priority of said transmitted frame, said token generating means, when a comparison result thereof indicates that said reservation priority of said transmitted frame is higher than said data priority of said current node, temporarily stopping transmitting a frame following said transmitted frame, storing said reservation priority of said transmitted frame in said current node, and generating a token having a ring priority corresponding to said reservation priority of said transmitted frame; and priority operating means, when said current node receives a token after temporarily generating said token having said ring priority, for comparing a ring priority of said received token with said reservation priority stored in said current node, said priority operating means recovering said ring priority of said received token to an original priority level corresponding to said reservation priority stored in said current node and re-starting to transmit a frame following said transmitted frame from said current node when a comparison result thereof indicates that both of said ring priority and reservation priority coincide with each other.

5. A local area network (LAN) employing a common clock sharing method comprising:

a plurality of nodes each performing data processing; and a transmission path for linking said plurality of nodes together so that a data transfer is performed among said plurality of nodes, wherein said common clock sharing method comprises steps of: connecting a timer generating a fundamental clock to one of said plurality of nodes and connecting counters each taking a count to the others of said plurality of nodes respectively;

transmitting data of a sequence number corresponding to said fundamental clock from said one to the others;

incrementing said sequence number every time said data of sequence number is transmitted;

setting, before receiving data of a sequence number, an expected value for each of the others, said expected value representing a count value of said connected counter, said expected value corresponding to said sequence number to be received at each of the others;

judging whether or not an transmission error is occurred between said one and each of the others based on a difference between said expected value and each of said sequence numbers received at the others; and correcting, when judging that said transmission error is occurred, said count value of said connected counter occurring said transmission error based on said difference such that the corrected count value is based upon the sequence number.

6. A local area network (LAN) having a plurality of nodes each of which performs data processing and has a specific address and a transmission path which links said plurality of nodes together so that a data transfer can be performed among said plurality of nodes, said local area network comprising:

a plurality of peripheral units, which are respectively coupled to said plurality of nodes, each having one of a function of generating data to be transmitted to a predetermined node other than said coupled node and a function of receiving data transmitted from another predetermined node other than said coupled node in response to a handshaking protocol;

each of said plurality of node having:

(a) a data input/output terminal through which said data is inputted or outputted between a node and a peripheral unit coupled thereto;

(b) a control signal input/output handshaking terminal through which control signal handshaking is inputted and outputted between said node and peripheral unit so as to control input or output of said data between said node and peripheral unit, each of said plurality of nodes previously storing one of a first address to transmit said data thereto and a second address to receive said data therefrom, each of said plurality of node, when said coupled peripheral unit generates data, directly inputting said data therefrom and transmitting said data to a predetermined node having a first address, and each of said plurality of node, when receiving data from a predetermined node having a second address, directly outputting said received data to said coupled peripheral unit.

7. A local area network (LAN) employing a common clock sharing method as defined in claim 5, wherein a frame is used for transmitting data which are transmitted from one node and circulating through said transmission path, and said data of the sequence number is transmitted with said frame from said one node.

8. A local area network (LAN) employing a common clock sharing method comprising:

a plurality of nodes each performing a data processing; and a transmission path for linking said plurality of nodes together so that a data transfer is performed among them, wherein a frame is used for transmitting data from one node to another node, wherein said common clock sharing method comprises steps of:

connecting an information generating means for generating timing information to one of said plurality of nodes;

setting, before receiving said timing information, an expected value for each of the other nodes, said expected value corresponding to said timing information which is received by each of the other nodes;

comparing said expected value with said timing information; and correcting, when said expected value does not coincide with said timing information, said expected value on the basis of a difference between said timing information and said expected value.

9. A controller for coupling a data processor to a token-ring-local area network, the network comprising:

a plurality of nodes linked by a transmission path for which which a token used for obtaining a transmission right is circulated through, said token having a first memory area for a ring priority which a second memory area for memorizing a reservation priority to be reserved by nodes based on a data priority of a priority of data owned by each node, wherein the controller comprises:

frame generation means for when the node has the token for generating and transmitting a frame having data to be transmitted from said current node without transmitting said received token;

data dividing means, when a data priority of said current node is lower than a predetermined boundary priority level and when data to be transmitted from said current node has a size which is larger than a predetermined size, for dividing the data to be transmitted from said current node into a plurality of divided data each having a size equal to or smaller than the predetermined size, said divided data being sequentially transmitted with frames from said current node; and token generating means, when said current node receives a transmitted frame back while said current node is sequentially transmitting said divided data with said frames, for comparing the data priority of said current node with a reservation priority of said transmitted frame, said token generating means stopping transmitting data frames and generating a token having a ring priority corresponding to said reservation priority of said transmitted frame when a comparison result thereof indicates that said reservation priority of said transmitted frame is higher than said data priority of said current node.

10. A controller for a node on a local area network, the network including a master clock and means for transmitting over the network timing data corresponding to the current state of the clock, the controller comprising:

means for receiving data from the network;

a counter;

means for setting the counter before receiving said timing data to an expected value of said timing data; and means for correcting the value of the counter when the expected value differs from the received timing data.

* * * * *